United States Patent
Oka et al.

(10) Patent No.: US 12,492,966 B2
(45) Date of Patent: Dec. 9, 2025

(54) ABNORMALITY DIAGNOSIS DEVICE AND ABNORMALITY DIAGNOSIS METHOD

(71) Applicant: MITSUBISHI HEAVY INDUSTRIES, LTD., Tokyo (JP)

(72) Inventors: Hirotaka Oka, Tokyo (JP); Masumi Nomura, Tokyo (JP); Tatsuo Ishiguro, Tokyo (JP); Katsuaki Morita, Tokyo (JP); Ryuji Ikeda, Tokyo (JP); Kenichi Nagahara, Tokyo (JP); Sota Kogawa, Tokyo (JP); Noriyuki Matsukura, Tokyo (JP); Satoshi Nikaido, Tokyo (JP); Yuki Nishizaki, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 294 days.

(21) Appl. No.: 18/017,868

(22) PCT Filed: Jul. 29, 2021

(86) PCT No.: PCT/JP2021/028030
§ 371 (c)(1),
(2) Date: Jan. 25, 2023

(87) PCT Pub. No.: WO2022/025162
PCT Pub. Date: Feb. 3, 2022

(65) Prior Publication Data
US 2023/0280240 A1  Sep. 7, 2023

(30) Foreign Application Priority Data

Jul. 31, 2020 (JP) .................................. 2020-130788

(51) Int. Cl.
*G01M 99/00* (2011.01)

(52) U.S. Cl.
CPC .................................. *G01M 99/005* (2013.01)

(58) Field of Classification Search
None
See application file for complete search history.

(56) References Cited

U.S. PATENT DOCUMENTS

| 8,838,324 B2* | 9/2014 | Suzuki ................. E02F 9/2025 714/39 |
| 2010/0131800 A1* | 5/2010 | Fujimaki ............ G05B 23/0281 702/183 |

(Continued)

FOREIGN PATENT DOCUMENTS

| JP | H06332528 A | 12/1994 |
| JP | H11119823 A | 4/1999 |

(Continued)

OTHER PUBLICATIONS

Written Opinion issued in Application No. PCT/JP2021/028030 mailed on Oct. 19, 2021 (8 pages).

(Continued)

*Primary Examiner* — Mark A Shabman
(74) *Attorney, Agent, or Firm* — Osha Bergman Watanabe & Burton LLP

(57) ABSTRACT

An abnormality diagnosis device includes an abnormality determination unit configured to determine whether or not there is an abnormality with respect to a state quantity acquired from equipment and a cause estimation unit configured to estimate a cause of the abnormality in the equipment from a state quantity determined to be abnormal by the abnormality determination unit using a cause correspondence table in which a cause of an abnormal mode of the equipment identified in fault tree analysis is associated with the state quantity that is abnormal when the cause has occurred.

5 Claims, 20 Drawing Sheets

(56) References Cited

U.S. PATENT DOCUMENTS

| | | | | |
|---|---|---|---|---|
| 2016/0342392 A1* | 11/2016 | Tasaki | ................ | G06Q 10/0639 |
| 2018/0247721 A1 | 8/2018 | Ono et al. | | |
| 2019/0087738 A1* | 3/2019 | Yang | ................ | G05B 23/0221 |
| 2019/0101908 A1* | 4/2019 | Park | ................ | G05B 23/0254 |
| 2019/0187676 A1* | 6/2019 | Nagano | .............. | G05B 23/0221 |
| 2019/0196460 A1* | 6/2019 | Rosca | ................ | G05B 23/0254 |
| 2019/0226943 A1* | 7/2019 | Hayashi | .............. | G01M 13/045 |
| 2020/0225644 A1* | 7/2020 | Shiizuka | ............ | G05B 19/4188 |

FOREIGN PATENT DOCUMENTS

| | | |
|---|---|---|
| JP | 6246755 B2 | 12/2017 |
| JP | 2019-204145 A | 11/2019 |

OTHER PUBLICATIONS

International Search Report issued in Application No. PCT/JP2021/028030 mailed on Oct. 19, 2021 (4 pages).

\* cited by examiner

CAUSE CORRESPONDENCE TABLE TB1

| PATTERN | OBSERVED VALUE A1 | OBSERVED VALUE A2 | OBSERVED VALUE A3 | DIAGNOSIS RESULT |
|---|---|---|---|---|
| 1 | NORMAL | NORMAL | ABNORMAL | CAUSE: 2 OR 3 IS POSSIBLE |
| 2 | NORMAL | ABNORMAL | NORMAL | CAUSE 1-2 |
| 3 | NORMAL | ABNORMAL | ABNORMAL | CAUSE 3-2 |
| 4 | ABNORMAL | NORMAL | NORMAL | CAUSE 1-1 |
| 5 | ABNORMAL | NORMAL | ABNORMAL | CAUSE 2 or CAUSE 3-1 |
| ⋮ | | | | |
| N | ABNORMAL | ABNORMAL | ABNORMAL | ALL CAUSES ARE POSSIBLE |

FIG. 7

DISCRETIZATION TABLE

| 2 LEVELS | 3 LEVELS | 5 LEVELS | 7 LEVELS |
|---|---|---|---|
| NORMAL | NEGATIVE | HIGH NEGATIVE | HIGH NEGATIVE |
| ABNORMAL | NORMAL | LOW NEGATIVE | MEDIUM NEGATIVE |
| | POSITIVE | NORMAL | LOW NEGATIVE |
| | | LOW POSITIVE | NORMAL |
| | | HIGH POSITIVE | LOW POSITIVE |
| | | | MEDIUM POSITIVE |
| | | | HIGH NEGATIVE |

FIG. 8

CAUSE CORRESPONDENCE TABLE TB2

| PATTERN | OBSERVED VALUE A1 | OBSERVED VALUE A2 | OBSERVED VALUE A3 | DIAGNOSIS RESULT |
|---|---|---|---|---|
| 1 | HIGH POSITIVE | NORMAL | NORMAL | CAUSE 1-1 |
| 2 | LOW POSITIVE | NORMAL | LOW NEGATIVE | CAUSE 2 |
| 3 | LOW NEGATIVE | NORMAL | HIGH NEGATIVE | CAUSE 3-1 |
| 4 | NORMAL | HIGH POSITIVE | NORMAL | CAUSE 1-2 |
| 5 | NORMAL | HIGH POSITIVE | HIGH NEGATIVE | CAUSE 3-2 |
| ⋮ | | | | |

CAUSE CORRESPONDENCE TABLE TB3

| PATTERN | STATE QUANTITY PV1 | STATE QUANTITY PV2 | OBSERVED VALUE A1 | DIAGNOSIS RESULT |
|---|---|---|---|---|
| 1 | HIGH POSITIVE | NORMAL | NORMAL | CAUSE 1-1 |
| 2 | LOW POSITIVE | NORMAL | LOW NEGATIVE | CAUSE 2 |
| 3 | LOW NEGATIVE | NORMAL | HIGH NEGATIVE | CAUSE 3-1 |
| 4 | NORMAL | HIGH POSITIVE | NORMAL | CAUSE 1-2 |
| 5 | NORMAL | HIGH POSITIVE | HIGH NEGATIVE | CAUSE 3-2 |
| ⋮ | | | | |

FULL-SCALE ERROR

INDICATED VALUE ERROR

ABNORMALITY DIAGNOSIS DEVICE AND ABNORMALITY DIAGNOSIS METHOD

TECHNICAL FIELD

The present disclosure relates to an abnormality diagnosis device, an abnormality diagnosis method, and a recording medium storing a program.

Priority is claimed on Japanese Patent Application No. 2020-130788, filed Jul. 31, 2020, the content of which is incorporated herein by reference.

BACKGROUND ART

Technology for detecting abnormal observed values in an observation system in equipment such as a large refrigerator or a submersible pump, a plant, or the like, performing abnormality diagnosis for identifying the cause of an abnormality, and monitoring the soundness thereof is known.

For example, in Patent Document 1, technology for creating a state estimation model of a plant from actual data observed in an observation system and identifying a location where abnormal behavior is performed, i.e., the cause of an abnormality, by determining that a part including an observed value with an increased variation in a prediction based on the state estimation model is abnormal is disclosed.

CITATION LIST

Patent Document

[Patent Document 1]
  Japanese Patent No. 6246755

SUMMARY OF INVENTION

Technical Problem

However, the technology described in Patent Document 1 is not a method of systematically indicating correspondence between the cause of an abnormality and an observed value of abnormal behavior. Therefore, in the technology described in Patent Document 1, even if an observed value that is abnormal can be identified, it is still necessary to provide a large number of independent observation systems each corresponding to each of causes of abnormalities so that the causes of the abnormalities are accurately diagnosed. Thus, there is a need for technology for accurately diagnosing abnormalities using existing observation systems.

The present disclosure has been made in view of such problems and provides an abnormality diagnosis device, an abnormality diagnosis method, and a recording medium storing a program capable of easily and accurately estimating the cause of an abnormality in equipment.

Solution to Problem

According to an aspect of the present disclosure, there is provided an abnormality diagnosis device including: an abnormality determination unit configured to determine whether or not there is an abnormality with respect to a state quantity acquired from equipment; and a cause estimation unit configured to estimate a cause of the abnormality in the equipment from a state quantity determined to be abnormal by the abnormality determination unit using a cause correspondence table in which a cause of an abnormal mode of the equipment identified in fault tree analysis is associated with the state quantity that is abnormal when the cause has occurred.

According to an aspect of the present disclosure, there is provided an abnormality diagnosis method including steps of: determining whether or not there is an abnormality with respect to a state quantity acquired from equipment; and estimating a cause of the abnormality in the equipment from a state quantity determined to be abnormal using a cause correspondence table in which a cause of an abnormal mode of the equipment identified in fault tree analysis is associated with the state quantity that is abnormal when the cause has occurred.

According to an aspect of the present disclosure, there is provided a non-transitory computer-readable recording medium storing a program for causing a computer of an abnormality diagnosis device to execute steps of: determining whether or not there is an abnormality with respect to a state quantity acquired from equipment; and estimating a cause of the abnormality in the equipment from a state quantity determined to be abnormal using a cause correspondence table in which a cause of an abnormal mode of the equipment identified in fault tree analysis is associated with the state quantity that is abnormal when the cause has occurred.

According to the present disclosure, an abnormality diagnosis device, an abnormality diagnosis method, and a recording medium storing a program can easily and accurately estimate the cause of an abnormality in equipment.

BRIEF DESCRIPTION OF DRAWINGS

FIG. 7 is a second diagram for describing a cause correspondence table according to the second embodiment of the present disclosure.

FIG. 8 is a third diagram for describing a cause correspondence table according to the second embodiment of the present disclosure.

DESCRIPTION OF EMBODIMENTS

Hereinafter, embodiments according to the present disclosure will be described with reference to the drawings. In all drawings, the same or equivalent components are denoted by the same reference signs and the common description will be omitted.

First Embodiment (Overall Configuration)

Figure 1:
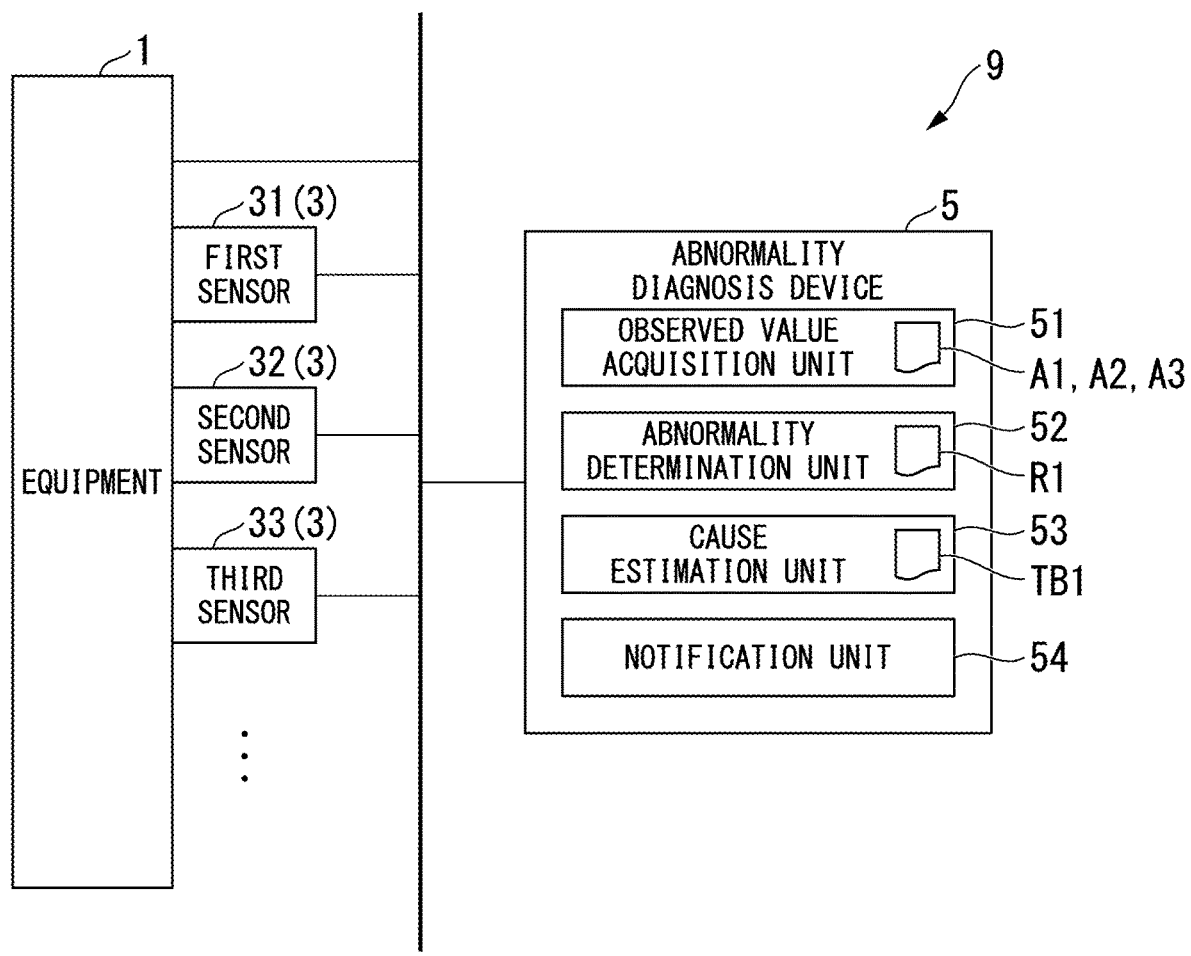
FIG. 1 is a diagram showing an overall configuration of a facility according to a first embodiment of the present disclosure.

FIG. 1 is a diagram showing an overall configuration of a facility according to the first embodiment of the present disclosure.

As shown in FIG. 1, a facility 9 includes equipment 1, an abnormality diagnosis device 5, and a first observation system 3.

The equipment 1 is, for example, a large refrigerator, a submersible pump, and the like.

The abnormality diagnosis device 5 detects whether or not there is an abnormality in the equipment 1 and diagnoses the cause of the abnormality. Also, the abnormality diagnosis device 5 is connected to the first observation system 3 by wire or wireless communication.

The first observation system 3 is a system for observing the state of the equipment 1 and includes, for example, a plurality of sensors (a first sensor 31, a second sensor 32, a third sensor 33, and the like).

The first sensor 31 may be, for example, a pressure sensor provided inside of the equipment 1 and configured to measure the internal pressure of the equipment 1 as an observed value A1. The second sensor 32 may be, for example, a thermometer provided at an inlet or an outlet of the equipment 1 and configured to measure an inlet temperature or an outlet temperature of the equipment 1 as an observed value A2. The third sensor 33 may be, for example, a flowmeter provided in the equipment 1 and configured to measure a flow rate of a liquid, gas, or the like flowing through the equipment 1 as an observed value A3. The observed values A1, A2, and A3, and the like are examples of state quantities of the equipment 1 in the present embodiment.

(Functional Configuration of Abnormality Diagnosis Device)

The abnormality diagnosis device 5 is a device for detecting whether or not there is an abnormality in the equipment 1 and estimating the cause of the abnormality. As shown in FIG. 1, the abnormality diagnosis device 5 includes an observed value acquisition unit 51, an abnormality determination unit 52, and a cause estimation unit 53.

The observed value acquisition unit 51 acquires the observed values A1, A2, and A3 observed by the first observation system 3 of the equipment 1 as the state quantities of the equipment 1.

The abnormality determination unit 52 determines whether or not there is an abnormality for each state quantity acquired from the equipment 1. In the present embodiment, the abnormality determination unit 52 determines that the observed values A1, A2, and A3 acquired by the observed value acquisition unit 51 are normal if they are within a constraint R1 and abnormal if they are outside of the constraint R1.

The cause estimation unit 53 estimates a cause of an abnormality in the equipment 1 from a state quantity determined to be abnormal by the abnormality determination unit 52 using a cause correspondence table TB1 in which the cause of an abnormal mode of the equipment 1 identified in fault tree analysis is associated with a state quantity that is abnormal when the cause has occurred.

The notification unit 54 is a display device, an audio output device, or the like for providing a notification of a determination result of the abnormality determination unit 52 and an estimation result of the cause estimation unit 53. Also, the notification unit 54 may provide a notification of data to a device different from the abnormality diagnosis device 5, such as a computer, a smartphone, or a tablet, operated by an operator who operates or monitors the equipment 1.

(Cause Correspondence Table)

Figures 2, 3:
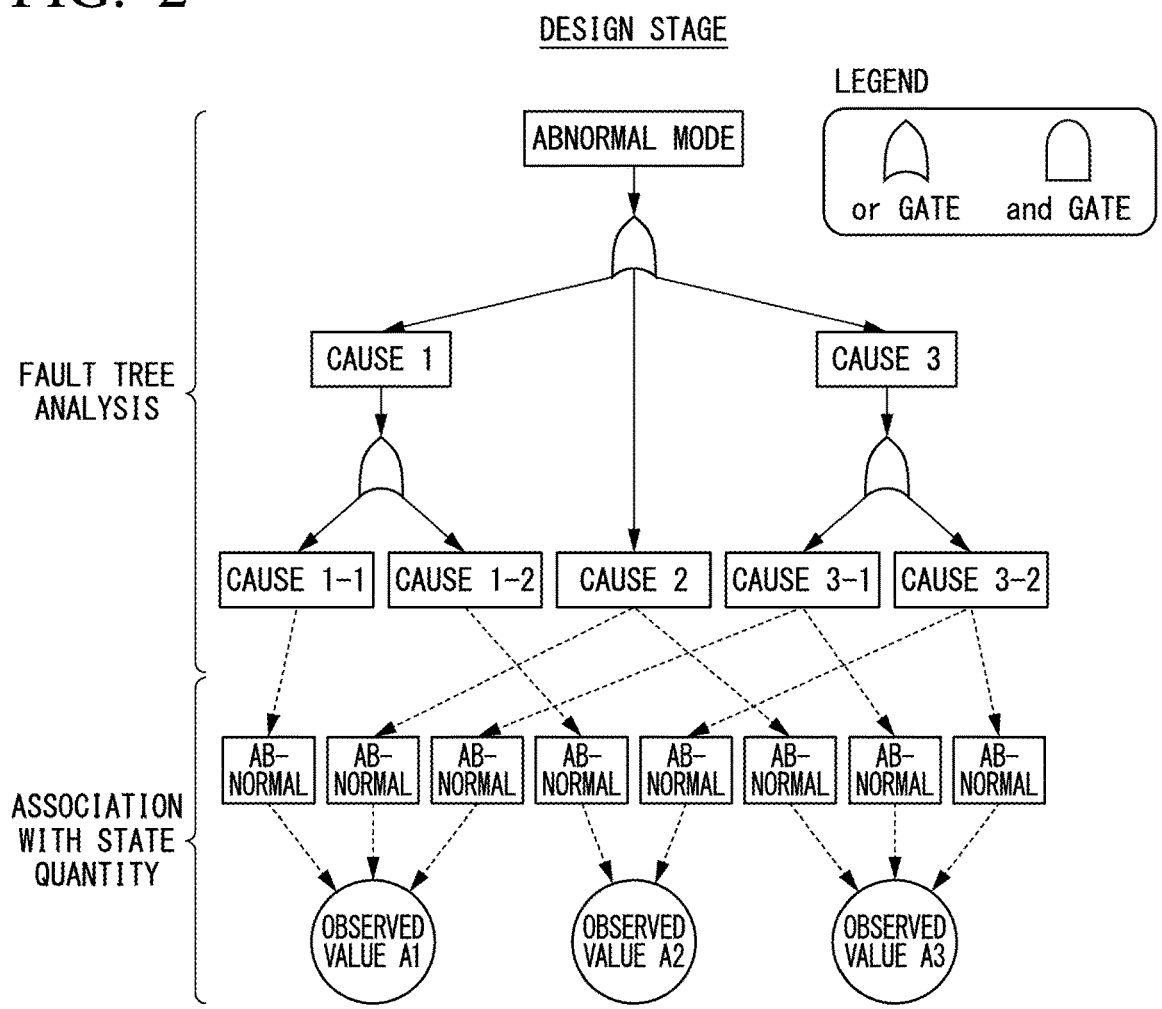
FIG. 2 is a first diagram for describing a cause correspondence table according to the first embodiment of the present disclosure.
FIG. 3 is a second diagram for describing a cause correspondence table according to the first embodiment of the present disclosure.

FIG. 2 is a first diagram for describing a cause correspondence table according to the first embodiment of the present disclosure.

FIG. 3 is a second diagram for describing a cause correspondence table according to the first embodiment of the present disclosure.

Figure 4:
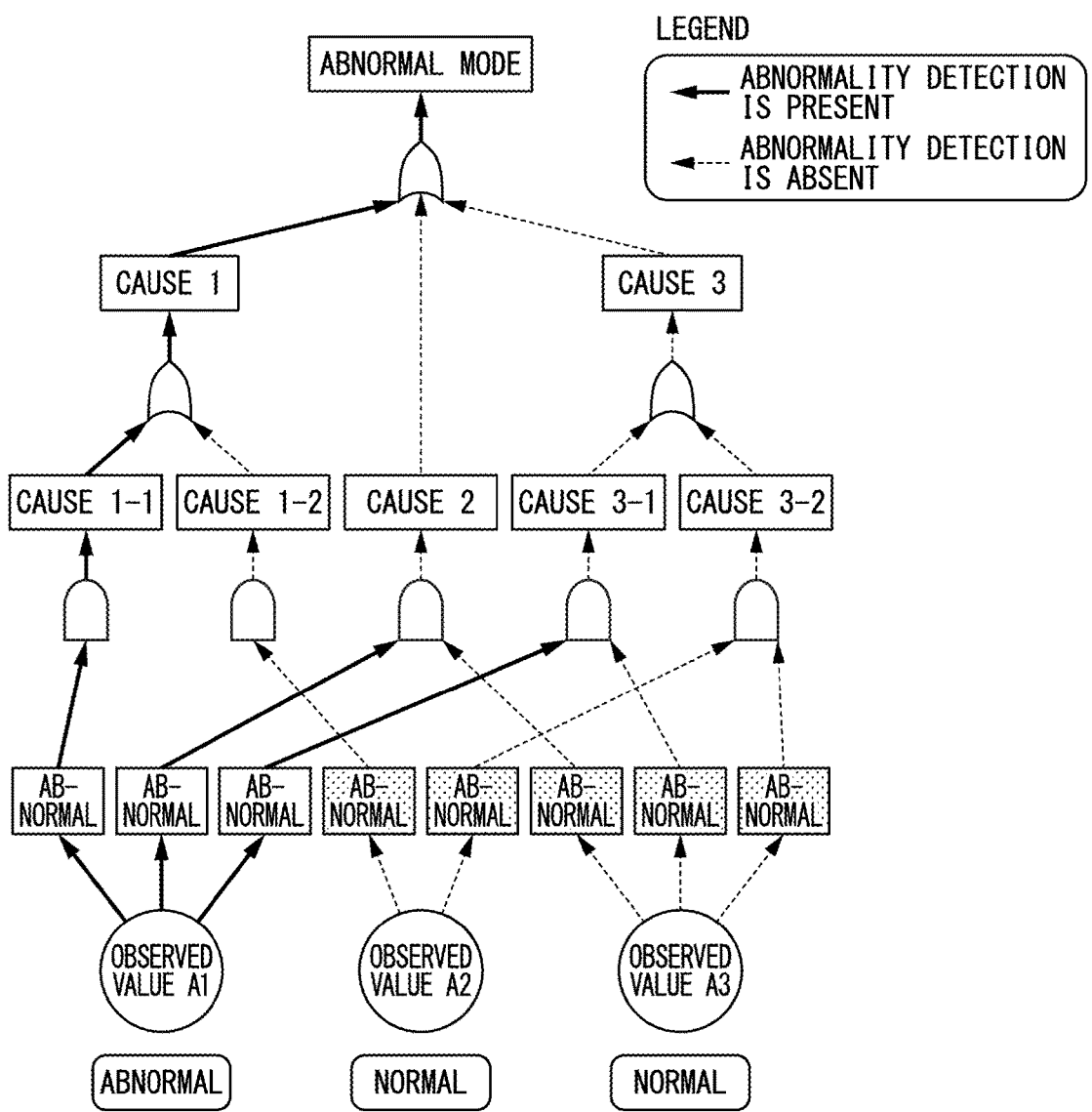
FIG. 4 is a third diagram for describing a cause correspondence table according to the first embodiment of the present disclosure.

FIG. 4 is a third diagram for describing a cause correspondence table according to the first embodiment of the present disclosure.

In the present embodiment, the cause correspondence table TB1 is assumed to be pre-created by a designer of the abnormality diagnosis device 5 or the like before the start of the operation of the equipment 1. A method of creating this cause correspondence table TB1 will be described with reference to FIGS. 2 to 4.

First, at the design stage of the abnormality diagnosis device 5, an operator who designs, develops, or maintains the abnormality diagnosis device 5 performs fault tree analysis of the equipment 1 on the basis of the product knowledge (the knowledge obtained from design, specifications, experience, and the like) of the equipment 1 and decomposes the abnormal mode capable of occurring in the equipment 1 into a plurality of causes as shown in FIG. 2.

The abnormal mode represents an undesirable failure, an accident, or the like of the equipment 1. Causes represent events related to the occurrence of the abnormal mode. The causes may be further decomposed into upper causes and lower causes causing the upper causes and arranged in a hierarchical shape. For example, an event that "the pressure of a condenser becomes high pressure and the operation is impossible" may be set as the abnormal mode. At this time, an event such as a "failure of a pressure sensor (the first sensor 31)" as cause 1 or an event in which a "pressure-specific observed value (the observed value A1) is actually large" as cause 3 may be set. Also, in relation to cause 3, a "malfunction of a cooling tower," a "malfunction of a circulation pump," or the like may be set as lower cause 3-1 or 3-2.

Although an example in which only one abnormal mode is set is shown in FIG. 2, the present disclosure is not limited thereto. In accordance with a configuration and characteristics of the equipment 1, a plurality of abnormal modes may be set and a tree as shown in FIG. 2 may be configured for each abnormal mode. Although an example in which the causes are decomposed into two layers is shown in FIG. 2, the present disclosure is not limited thereto. In accordance with the configuration and characteristics of the equipment 1, the causes may be decomposed into three or more layers.

Also, the operator associates each of the plurality of causes obtained in the fault tree analysis with an observed value that becomes an abnormal value (a value outside of the constraint R1) when this cause has occurred. In the present embodiment, as shown in FIG. 2, the operator associates the causes with the observed values A1, A2, and A3 that can be observed by the first observation system 3 of the equipment 1. For example, if it is known that the observed value A1 and the observed value A3 are abnormal when cause 3-1 has occurred from the product knowledge of the equipment 1, the observed value A1 and the observed value A3 are associated with cause 3-1.

When the association between the fault tree analysis result and the observed value is completed, the operator creates a cause correspondence table TB1 as shown in FIG. 3. The cause correspondence table TB1 shows which cause of the abnormal mode can occur for each combination pattern of results of determining the observed values A1, A2, and A3.

For example, as shown in FIG. 4, it is assumed that only the observed value A1 of the equipment 1 is determined to be abnormal. In this case, three causes of "cause 1-1," "cause 2," and "cause 3-1" are considered as causes that can occur when the observed value A1 is abnormal. However, "cause 2" and "cause 3-1" are causes that occur when both observed values A1 and A3 are abnormal. In the example of FIG. 4, because the observed value A3 is normal, it is excluded from a candidate for the cause. Therefore, in the present example, it is possible to estimate that "cause 1-1 (cause 1)" is a cause that caused the abnormal mode. In this way, the operator creates the cause correspondence table TB1 shown in FIG. 3 by associating causes that may occur with each combination pattern of the results of determining the observed values A1, A2, and A3.

(Processing Flow of Abnormality Diagnosis Method)

Figure 5:
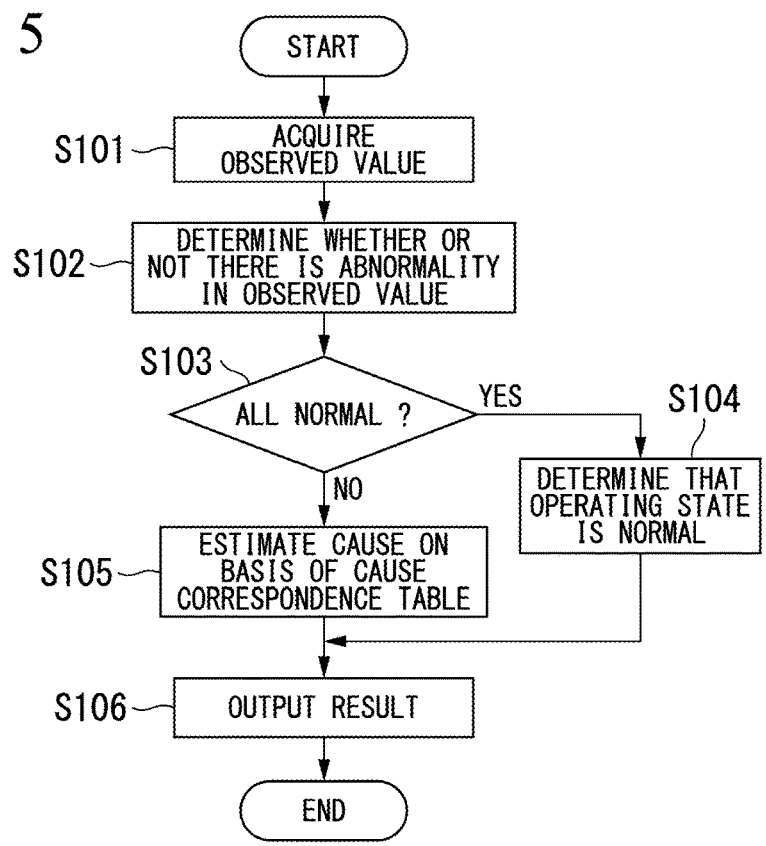
FIG. 5 is a flowchart showing an example of a process of an abnormality diagnosis device according to the first embodiment of the present disclosure.

FIG. 5 is a flowchart showing an example of a process of the abnormality diagnosis device according to the first embodiment of the present disclosure.

Hereinafter, details of the abnormality diagnosis process of the abnormality diagnosis device 5 according to the present embodiment will be described with reference to FIG. 5.

As shown in FIG. 5, the observed value acquisition unit 51 of the abnormality diagnosis device 5 acquires the observed values A1, A2, and A3 from the first sensor 31, the second sensor 32, and the third sensor 33 of the equipment 1 (step S101).

Subsequently, the abnormality determination unit 52 of the abnormality diagnosis device 5 determines whether or not there is an abnormality for each of the observed values A1, A2, and A3 (step S102).

Subsequently, the cause estimation unit 53 of the abnormality diagnosis device 5 determines whether or not there is an observed value determined to be abnormal (step S103).

For example, the abnormality determination unit 52 determines that the observed value A1 is normal when the observed value A1 is less than or equal to a threshold value (an upper limit value or a lower limit value) set as the constraint R1. On the other hand, the abnormality determination unit 52 determines that the observed value A1 is abnormal when the observed value A1 exceeds the threshold value.

Also, the abnormality determination unit 52 may determine that the observed value A1 is normal when an amount of change in the observed value A1 is less than or equal to the threshold value set as the constraint R1. In this case, the abnormality determination unit 52 determines that the observed value A1 is abnormal when the amount of change in the observed value A1 exceeds the threshold value.

Furthermore, the abnormality determination unit 52 may determine whether the observed value A1 indicates a normal pattern within the constraint R1 or indicates an abnormal pattern outside of the constraint R1 using a known abnormality detection algorithm using a k-nearest neighbor algorithm, a one class support vector machine (SVM), or the like.

The abnormality determination unit 52 determines whether the observed values A2 and A3 are normal or abnormal, respectively.

Subsequently, the abnormality determination unit 52 determines whether or not all observed values were normal (step S103).

When the abnormality determination unit 52 determines that all observed values A1, A2, and A3 are normal (step S103: YES), the abnormality determination unit 52 determines that the operating state of the equipment 1 is normal (step S104).

On the other hand, when the abnormality determination unit 52 determines that at least one of the observed values A1, A2, and A3 is abnormal (step S103: NO), it is determined that the operating state of the equipment 1 is abnormal (an abnormal mode has occurred). In this case, the cause estimation unit 53 estimates the cause of the abnormal mode on the basis of the cause correspondence table TB1 (FIG. 3) (step S105).

Specifically, the cause estimation unit 53 selects a cause associated with a combination pattern of an observed value determination result of the abnormality determination unit 52 from the cause correspondence table TB1. For example, as in the example of FIG. 4, it is assumed that a result of determining the observed value A1 is "abnormal" and results of determining the observed values A2 and A3 are "normal." In this case, the cause estimation unit 53 estimates that "cause 1-1" associated with "pattern 4" indicating a determination result combination is a cause of the abnormal mode of the equipment 1 with reference to the cause correspondence table TB1.

Also, as shown in "pattern 5" of FIG. 3, there may be a pattern in which the causes cannot be narrowed down to one. In this case, the cause estimation unit 53 may estimate both "cause 2" and "cause 3-1" corresponding to "pattern 5" as candidates for the cause of the abnormal mode without identifying only one cause of the abnormal mode.

Also, in relation to "pattern 5" in which the causes cannot be narrowed down to one from the cause correspondence table TB1, for example, an additional observation system (not shown) for identifying "cause 2" and "cause 3-1" may be provided in the equipment 1 in another embodiment. In this case, the cause estimation unit 53 may further estimate whether the cause of the abnormal mode when "pattern 5" is observed is "cause 2" or "cause 3-1" on the basis of the observed value obtained from this additional observation system. At this time, it is only necessary to provide the additional observation system only at locations corresponding to causes that cannot be identified only by the observed values of the first observation system 3, such as "cause 2" and "cause 3-1" of "pattern 5." Therefore, it is not necessary to provide an additional observation system for causes that can be narrowed down to one from the observed values of the first observation system 3. Thus, even if an additional observation system is provided for identifying the causes, the increase in the number of observation systems can be minimized.

In yet another embodiment, the cause estimation unit 53 may further estimate whether the cause of the abnormal mode when "pattern 5" is observed is "cause 2" or "cause 3-1" by further executing an inspection procedure for narrowing down the causes. Thereby, because an additional observation system for identifying causes is not required, the cost related to the diagnosis of an abnormality in the equipment 1 can be suppressed.

Subsequently, the notification unit 54 provides a notification of the determination result of the abnormality determination unit 52 (step S106). Also, when the operating state of the equipment 1 is determined to be abnormal by the abnormality determination unit 52, the notification unit 54 further provides a notification of a cause estimated by the cause estimation unit 53.

The abnormality diagnosis device 5 detects whether or not there is an abnormality in the equipment 1 in real time by iteratively executing a series of processing steps shown in FIG. 5 during the operation of the equipment 1 and estimates the cause of the abnormality when an abnormality occurs.

Operation and Effects

As described above, in the abnormality diagnosis device 5 according to the present embodiment, when the abnormality determination unit 52 detects at least one abnormality among state quantities (the observed values A1, A2, and A3) acquired from the equipment 1, the cause estimation unit 53 estimates the cause of the abnormal mode of the equipment 1 on the basis of the cause correspondence table TB1 in which the cause of the abnormal mode is pre-associated with the state quantity that is abnormal when the cause has occurred.

Thereby, the abnormality diagnosis device 5 can easily and accurately estimate the cause of the abnormality in the equipment 1 on the basis of the cause correspondence table TB1.

Second Embodiment

Subsequently, the abnormality diagnosis device 5 according to the second embodiment of the present disclosure will be described. Components that are the same as those of the first embodiment are denoted by the same reference signs and detailed description thereof will be omitted.

(Cause Correspondence Table)

Figure 6:
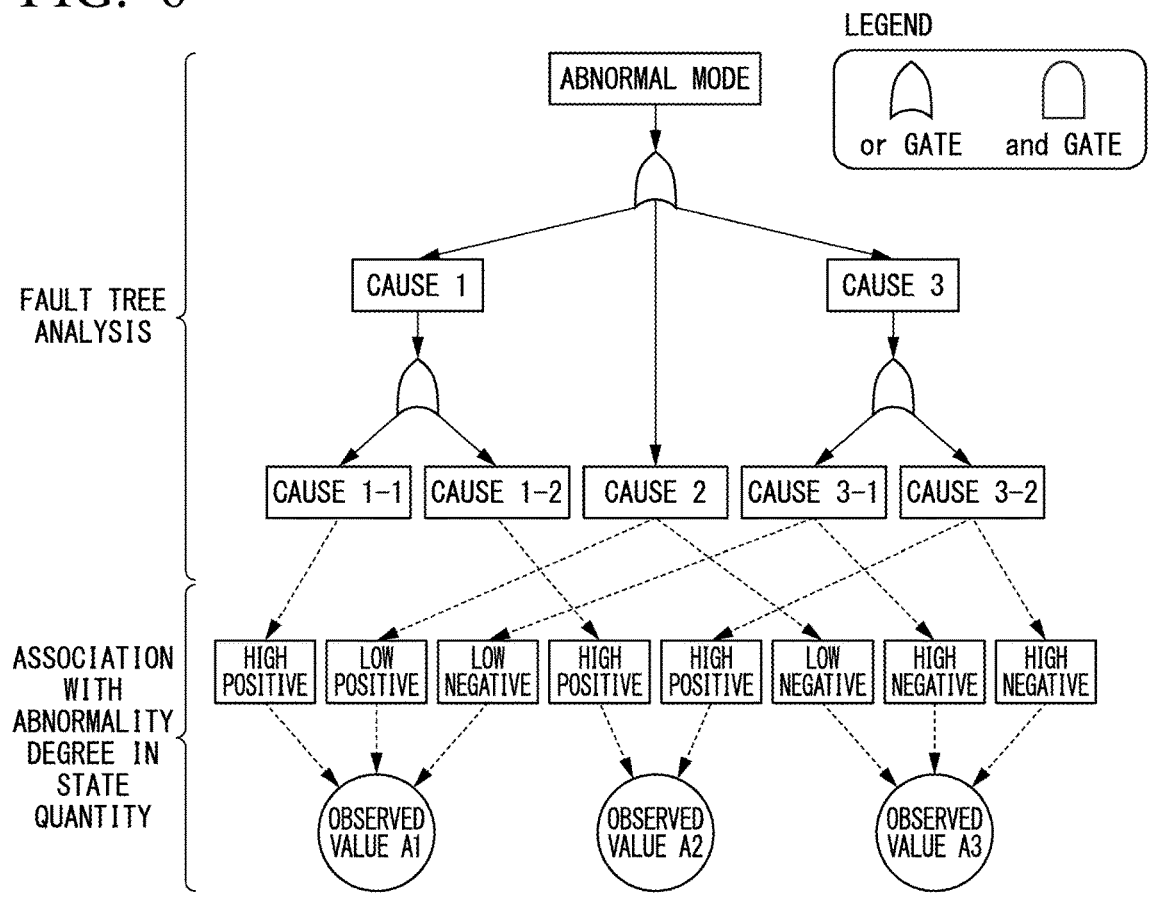
FIG. 6 is a first diagram for describing a cause correspondence table according to a second embodiment of the present disclosure.

FIG. 6 is a first diagram for describing a cause correspondence table according to a second embodiment of the present disclosure.

FIG. 7 is a second diagram for describing a cause correspondence table according to the second embodiment of the present disclosure.

FIG. 8 is a third diagram for describing a cause correspondence table according to the second embodiment of the present disclosure.

In the present embodiment, it is assumed that a cause correspondence table TB2 is pre-created by the designer of the abnormality diagnosis device 5 or the like before the start of operation of the equipment 1. A method of creating a cause correspondence table TB2 according to the present embodiment will be described with reference to FIGS. 6 to 8.

First, as shown in FIG. 6, at the design stage of the abnormality diagnosis device 5, an operator who designs, develops, or maintains the abnormality diagnosis device 5 performs fault tree analysis of the equipment 1. This is similar to the first embodiment. Also, in the present embodiment, an abnormality degree for a possible value of each of the observed values A1, A2, and A3 when this cause occurs is associated with each of the plurality of causes obtained in the fault tree analysis.

The abnormality degree is an evaluation value obtained by discretizing each observed value into a plurality of levels in accordance with a difference from the constraint R1 set for each observed value. For example, the abnormality degree may be discretized as any one of two to seven levels for each observed value as shown in the discretization table of FIG. 7. For example, in the case of discretization into three levels, the abnormality degree is expressed by three levels: "negative" in which the observed value is a value at the negative side of the constraint R1, "normal" in which the observed value is within the constraint R1, and "positive" in which the observed value is a value at the positive side of the constraint R2. Also, in the case of discretization into five levels, for example, in accordance with how negative/positive the observed value is from the constraint R1, "negative"/"positive" may be further divided into two levels of "high negative"/"high positive" and "low negative"/"low positive." In the case of discretization into seven levels, for example, in accordance with how negative/positive the observed value is from the constraint R1, "negative"/"positive" may be further divided into three levels of "high negative"/"high positive," "medium negative"/"medium positive," and "low negative"/"low positive."

In the present embodiment, for example, when it is difficult to narrow down the causes to one with only two abnormality levels ("normal" or "abnormal") (for example, "pattern 5" in the cause correspondence table TB1 of FIG. 3), the abnormality degree in the observed value is subdivided into three to seven levels. The discretization level may differ according to each observed value. In the present embodiment, as shown in FIG. 6, an example in which each observed value is represented by five abnormality levels will be described.

When the association between the fault tree analysis result and the abnormality degree in the observed value is completed, the operator creates a cause correspondence table TB2 as shown in FIG. 8. The cause correspondence table TB2 shows which cause of the abnormal mode can occur for each combination pattern of the abnormality degrees in the observed values A1, A2, and A3.

(Processing Flow of Abnormality Diagnosis Method)

Figure 9:
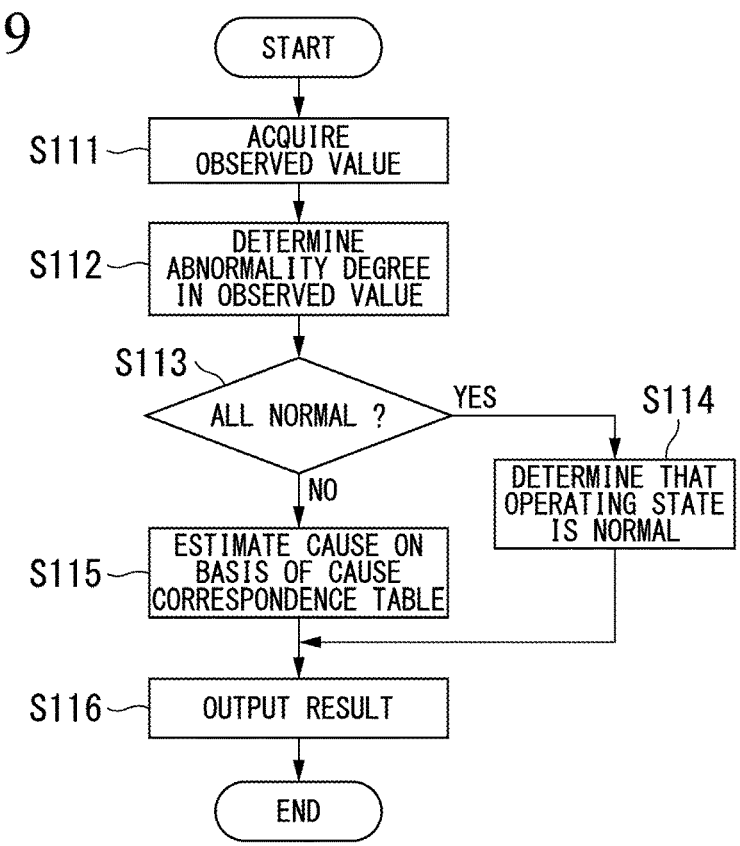
FIG. 9 is a flowchart showing an example of a process of an abnormality diagnosis device according to the second embodiment of the present disclosure.

FIG. 9 is a flowchart showing an example of a process of the abnormality diagnosis device according to the second embodiment of the present disclosure.

Hereinafter, details of the abnormality diagnosis process of the abnormality diagnosis device 5 according to the present embodiment will be described with reference to FIG. 9.

As shown in FIG. 9, the observed value acquisition unit 51 of the abnormality diagnosis device 5 acquires the observed values A1, A2, and A3 from the first sensor 31, the second sensor 32, and the third sensor 33 of the equipment 1 (step S111).

Subsequently, the abnormality determination unit 52 of the abnormality diagnosis device 5 determines an abnormality degree corresponding to a difference of each of the observed values A1, A2, and A3 from the constraint R1 set for each observed value (step S112).

For example, the abnormality determination unit 52 determines that the observed value A1 is one of five abnormality levels of "high negative," "low negative," "normal," "low positive," and "high positive." The abnormality determination unit 52 determines that the observed value A1 is normal, for example, when the observed value A1 is within a range of a first lower limit value or more and less than a first upper limit value set as the constraint R1. Also, the abnormality determination unit 52 determines that the abnormality level in the observed value A1 is "low negative" when the observed value A1 is less than the first lower limit value and greater than or equal to the second lower limit value and determines that the abnormality level in the observed value A1 is "high negative" when the observed value A1 is less than the second lower limit value. The abnormality determination unit 52 determines that the abnormality level in the observed value A1 is "low positive" when the observed value A1 is greater than or equal to the first upper limit value and less than the second upper limit value and determines that the abnormality level in the observed value A1 is "high positive" when the observed value A1 is greater than or equal to the second upper limit value.

Also, in other embodiments, the abnormality determination unit 52 may determine the abnormality degree on the basis of an amount of change in the observed value A1 or may determine an abnormality degree in the observed value A1 using a known abnormality detection algorithm using a k-nearest neighbor algorithm, a one class SVM, or the like.

Also, the abnormality determination unit 52 similarly determines the abnormality degree for the observed values A2 and A3.

Subsequently, the abnormality determination unit 52 determines whether or not abnormality degrees in all observed values are normal (step S113).

When the abnormality determination unit 52 determines that the abnormality degrees in all observed values A1, A2, and A3 are normal (step S113: YES), the abnormality determination unit 52 determines that the operating state of the equipment 1 is normal (step S114).

On the other hand, when it is determined that at least one of the abnormality levels of the observed values A1, A2, and A3 is a level other than the normal level (any one of a high negative level, a low negative level, a low positive level, and a high positive level) (step S113: NO), the abnormality determination unit 52 determines that the operating state of the equipment 1 is abnormal (an abnormal mode has occurred). In this case, the cause estimation unit 53 estimates the cause of the abnormal mode on the basis of the cause correspondence table TB2 (FIG. 8) (step S115).

Specifically, the cause estimation unit 53 selects a cause associated with a combination pattern of abnormality degrees in observed values by the abnormality determination unit 52 from the cause correspondence table TB2. For example, as in the example of FIG. 8, it is assumed that the abnormality degree in the observed value A1 is "low positive," the abnormality degree in the observed value A2 is "normal," and the abnormality degree in the observed value A3 is "low negative." In this case, the cause estimation unit 53 estimates that "cause 2" associated with "pattern 2" indicating a combination of the determination results is the cause of the abnormal mode of the equipment 1 with reference to the cause correspondence table TB2.

Subsequently, the notification unit 54 provides a notification of the determination result of the abnormality determination unit 52 (step S116). Also, when the operating state of the equipment 1 is determined to be abnormal by the abnormality determination unit 52, the notification unit 54 further provides a notification of the cause estimated by the cause estimation unit 53.

The abnormality diagnosis device 5 detects whether or not there is an abnormality in the equipment 1 in real time by iteratively executing the series of processing steps shown in FIG. 9 during the operation of the equipment 1 and estimates the cause of the abnormality when the abnormality occurs.

Operation and Effects

As described above, in the abnormality diagnosis device 5 according to the present embodiment, the abnormality determination unit 52 further determines the abnormality degree with respect to each state quantity in accordance with the difference of each observed value from the constraint R1. The cause estimation unit 53 estimates the cause of the abnormal mode of the equipment 1 using the cause correspondence table TB2 in which the cause of the abnormal mode is pre-associated with the abnormality degree for each observed value.

For example, in the first embodiment, it may be difficult to narrow down the causes of the abnormal mode to one from the determination result (two levels) indicating whether or not there is an abnormality in the observed value. However, the abnormality diagnosis device 5 according to the present embodiment can narrow down the causes more finely by making a determination after subdividing each observed value into a large number of abnormality levels instead of two levels of "normal" and "abnormal."

Third Embodiment

Next, the abnormality diagnosis device 5 according to the third embodiment of the present disclosure will be described. Components that are the same as those of the first and second embodiments are denoted by the same reference signs and detailed description thereof will be omitted.
(Functional Configuration of Abnormality Diagnosis Device)

Figure 10:
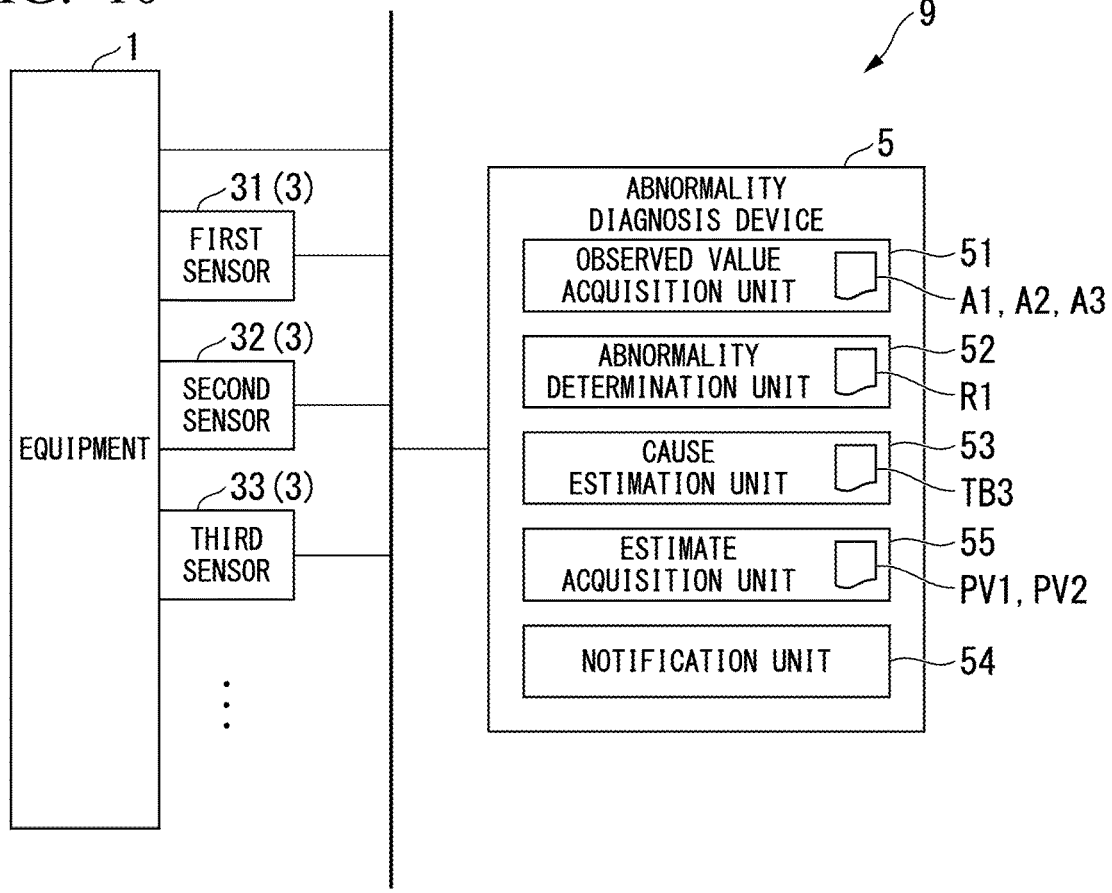
FIG. 10 is a diagram showing a functional configuration of an abnormality diagnosis device according to a third embodiment of the present disclosure.

FIG. 10 is a diagram showing a functional configuration of an abnormality diagnosis device according to the third embodiment of the present disclosure.

As shown in FIG. 10, the abnormality diagnosis device 5 according to the present embodiment further includes an estimate acquisition unit 55.

The estimate acquisition unit 55 acquires physical quantity estimates PV1 and PV2 and the like of the equipment 1 estimated on the basis of the observed values A1, A2, and A3 acquired by the observed value acquisition unit 51 as state quantities of the equipment 1. Also, in the present embodiment, the physical quantity estimate PV is an internal state quantity of the equipment 1 that cannot be observed by the observation system that affects a relationship between input and output conditions of the equipment 1. The physical quantity estimate PV is, for example, a work quantity within the equipment 1 such as a terminal temperature difference or a refrigerating capacity of a heat exchanger provided in the equipment 1 or the like.
(Cause Correspondence Table)

Figures 11, 12:
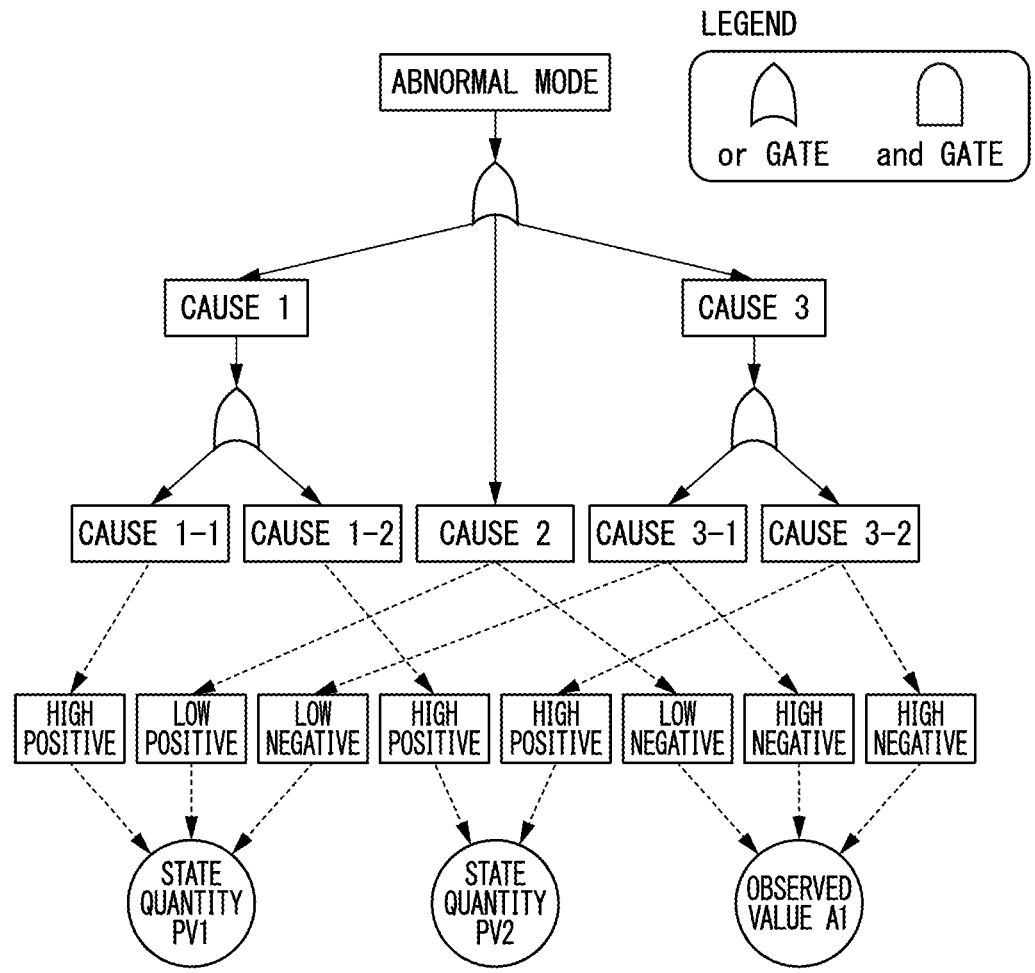
FIG. 11 is a first diagram for describing a cause correspondence table according to the third embodiment of the present disclosure.
FIG. 12 is a second diagram for describing the cause correspondence table according to the third embodiment of the present disclosure.

FIG. 11 is a first diagram for describing a cause correspondence table according to the third embodiment of the present disclosure.

FIG. 12 is a second diagram for describing the cause correspondence table according to the third embodiment of the present disclosure.

A cause correspondence table TB3 is assumed to be pre-created by a designer of the abnormality diagnosis device 5 or the like before the start of operation of the equipment 1 in the present embodiment as well. A method of creating the cause correspondence table TB3 according to the present embodiment will be described with reference to FIGS. 11 and 12.

First, as shown in FIG. 11, at the design stage of the abnormality diagnosis device 5, an operator who designs, develops, or maintains the abnormality diagnosis device 5 performs fault tree analysis of the equipment 1. This is similar to the first and second embodiments. Also, in the present embodiment, an abnormality degree for a possible value of each of the physical quantity estimate PV1, the physical quantity estimate PV2, the observed value A1, and the like is associated with each of the plurality of causes obtained in the fault tree analysis. Although an example in which the physical quantity estimates PV1 and PV2 and the state quantity A1 are classified according to five abnormality levels in FIG. 11, the present disclosure is not limited thereto. As long as it is possible to narrow down the causes of the abnormal mode to one, an abnormality degree in each of the physical quantity and the observed value may be set to any one of two to seven levels shown in FIG. 7.

When the association between the fault tree analysis result and the abnormality degree in the physical quantity and the observed value is completed, the operator creates the cause correspondence table TB3 as shown in FIG. 12. The cause correspondence table TB3 shows which cause of the abnormal mode can occur for each combination pattern of abnormality degrees in the physical quantity estimate PV1, the physical quantity estimate PV2, and the observed value A1.
(Processing Flow of Abnormality Diagnosis Method)

Figure 13:
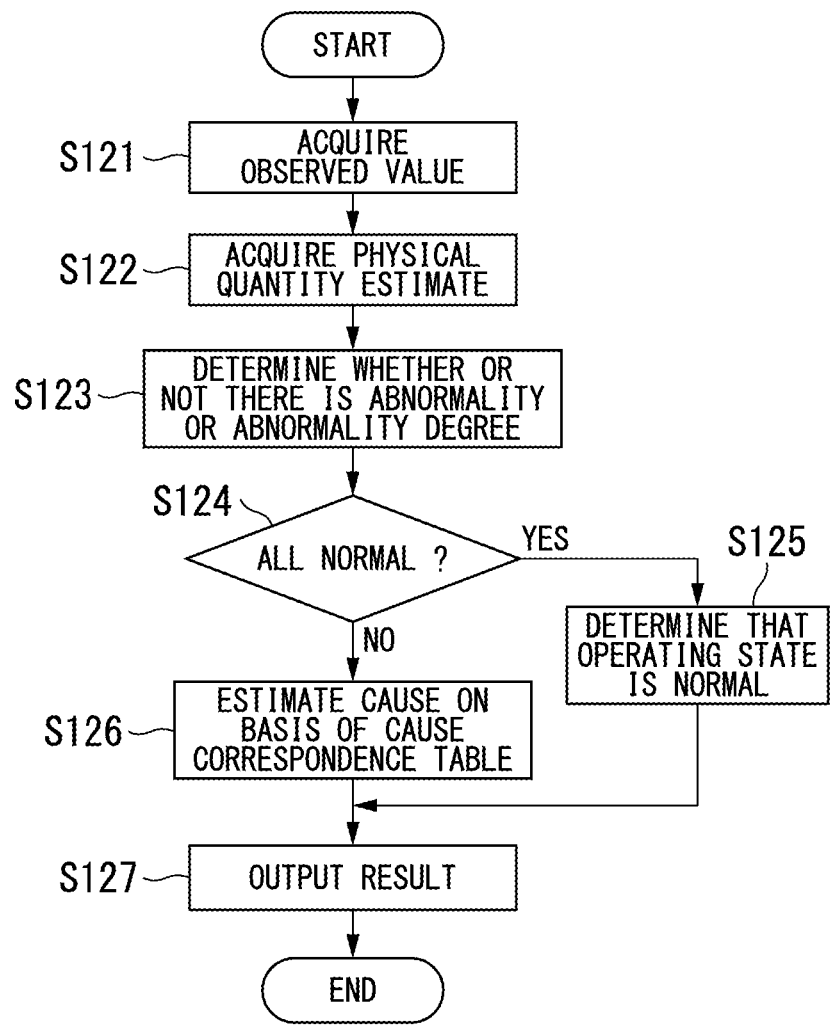
FIG. 13 is a flowchart showing an example of a process of an abnormality diagnosis device according to the third embodiment of the present disclosure.

FIG. 13 is a flowchart showing an example of a process of the abnormality diagnosis device according to the third embodiment of the present disclosure.

Hereinafter, details of the abnormality diagnosis process of the abnormality diagnosis device 5 according to the present embodiment will be described with reference to FIG. 13.

As shown in FIG. 13, the observed value acquisition unit 51 of the abnormality diagnosis device 5 acquires the observed values A1, A2, and A3 from the first sensor 31, the second sensor 32, and the third sensor 33 of the equipment 1 (step S121).

Subsequently, the estimate acquisition unit 55 of the abnormality diagnosis device 5 acquires the physical quantity estimates PV1 and PV2 of the equipment 1 estimated on the basis of the observed values A1, A2, and A3 (step S122). For example, the estimate acquisition unit 55 estimates and acquires the physical quantity estimates PV1 and PV2 of the equipment 1 using a known estimation algorithm using a Kalman filter, a hidden Markov model, or the like.

Subsequently, the abnormality determination unit 52 of the abnormality diagnosis device 5 determines whether or not there is an abnormality or the abnormality degree for each of the observed value A1 acquired by the observed value acquisition unit 51 and the physical quantity estimates PV1 and PV2 estimated by the estimate acquisition unit 55 (step S123). Content of the specific processing is similar to step S102 (FIG. 5) of the first embodiment or step S112 (FIG. 9) of the second embodiment.

Subsequently, the abnormality determination unit 52 determines whether or not all observed values and physical quantities are normal (step S124).

When it is determined that all of the observed values A1 and the physical quantity estimates PV1 and PV2 are normal (step S124: YES), the abnormality determination unit 52 determines that the operating state of the equipment 1 is normal (step S125).

On the other hand, when it is determined that at least one of the abnormality levels of the observed value A1 and the physical quantity estimates PV1 and PV2 is a level other than the normal level (any one of an abnormal level, a high negative level, a low negative level, a low positive level, and a high positive level) (step S124: NO), the abnormality determination unit 52 determines that the operating state of the equipment 1 is abnormal (an abnormal mode has occurred). In this case, the cause estimation unit 53 estimates the cause of the abnormal mode on the basis of the cause correspondence table TB3 (FIG. 12) (step S126). Content of the specific processing is similar to step S105 (FIG. 5) of the first embodiment and step S115 (FIG. 9) of the second embodiment.

Subsequently, the notification unit 54 provides a notification of the determination result by the abnormality determination unit 52 (step S127). Also, when the operating state of the equipment 1 is determined to be abnormal by the abnormality determination unit 52, the notification unit 54 further provides a notification of a cause estimated by the cause estimation unit 53.

The abnormality diagnosis device 5 detects whether or not there is an abnormality in the equipment 1 in real time and estimates the cause of the abnormality when an abnormality occurs by iteratively executing the series of processing steps shown in FIG. 13 during the operation of the equipment 1.

Operation and Effects

As described above, the abnormality diagnosis device 5 according to the present embodiment further includes the estimate acquisition unit 55 configured to estimate the physical quantity estimates PV1 and PV2 of the equipment 1 that cannot be observed by the first observation system 3.

Thereby, the abnormality diagnosis device 5 can perform the determination of whether or not there is an abnormality and the estimation of a cause of the abnormality using the physical quantity estimates PV1 and PV2 obtained by estimating the internal state quantity of the equipment 1 in addition to the observed value A1 acquired from the first observation system 3 of the equipment 1. Thereby, the abnormality diagnosis device 5 can improve the accuracy of detection even in an abnormal mode whose detection is difficult only from changing in the observed value.

Fourth Embodiment

Next, the abnormality diagnosis device 5 according to a fourth embodiment of the present disclosure will be described. Components that are the same as those of the first to third embodiments are denoted by the same reference signs and detailed description thereof will be omitted.

Figure 14:
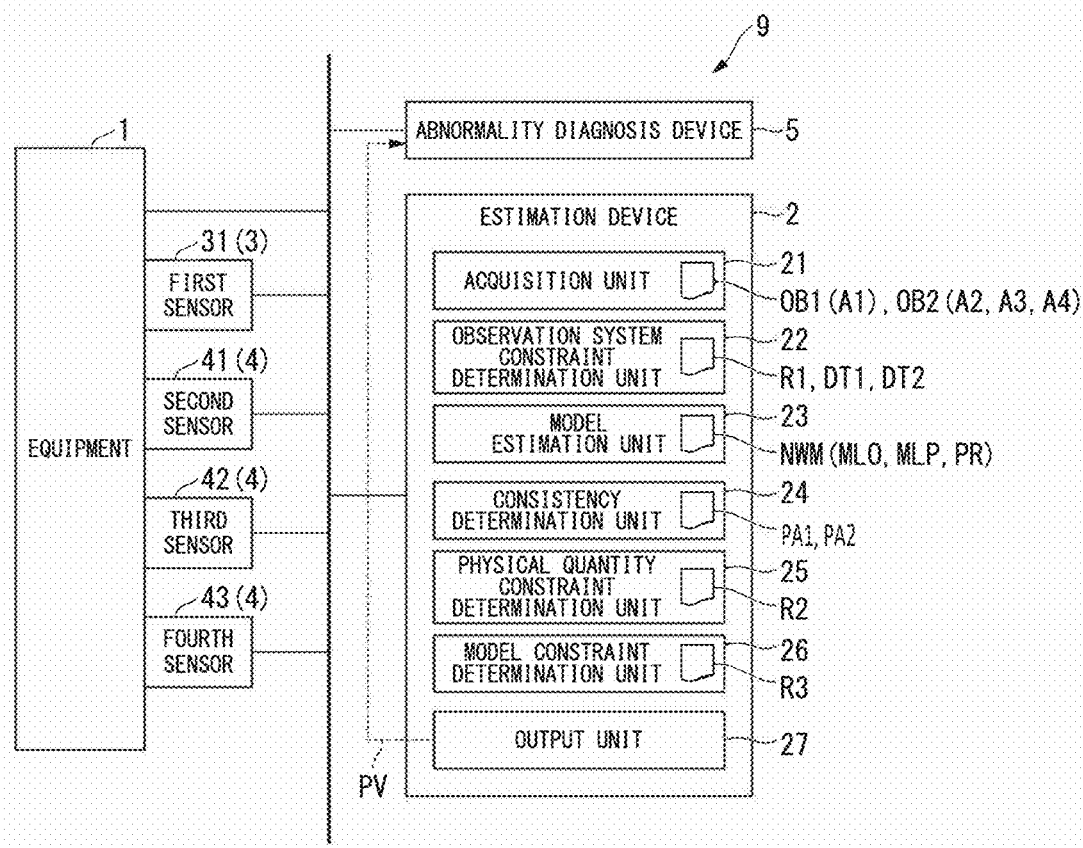
FIG. 14 is a diagram showing an overall configuration of a facility according to a fourth embodiment of the present disclosure.

FIG. 14 is a diagram showing an overall configuration of a facility according to the fourth embodiment of the present disclosure.

As shown in FIG. 14, a facility 9 according to the present embodiment further includes an estimation device 2. Also, the facility 9 according to the present embodiment further includes a second observation system 4 in addition to a first observation system 3.

(Configuration of First Observation System)

The first observation system 3 is a system for observing a state of equipment 1.

The first observation system 3 observes a first observed value OB1.

For example, the first observation system 3 may be provided in the equipment 1.

For example, the first observation system 3 may include a first sensor 31.

For example, the first observation system 3 may observe an observed value A1 as the first observed value OB1.

For example, the first sensor 31 may be provided inside of, for example, the equipment 1. At this time, the first sensor 31 may be a pressure sensor that measures the internal pressure of the equipment 1 as the observed value A1.

(Configuration of Second Observation System)

The second observation system 4 is a system for observing the state of the equipment 1.

The second observation system 4 observes a second observed value OB2.

The second observation system 4 is another observation system that is independent of the first observation system 3.

For example, the second observation system 4 may be provided in the equipment 1.

For example, the second observation system 4 may include a second sensor 41, a third sensor 42, and a fourth sensor 43.

For example, the second observation system 4 may observe observed values A2, A3, and A4 as the second observed value OB2.

For example, the second sensor 41 may be provided at, for example, an outlet of the equipment 1. At this time, the second sensor 41 may be a thermometer that measures an outlet temperature, which is the temperature of a fluid such as a liquid or gas outgoing from the inside of the equipment 1, as the observed value A2.

Also, the third sensor 42 may be provided at, for example, an inlet of the equipment 1, for example. At this time, the third sensor 42 may be a thermometer that measures an inlet temperature, which is the temperature of a fluid such as a liquid or gas incoming into the equipment 1, as the observed value A3.

Also, the fourth sensor 43 may be provided in, for example, the equipment 1. At this time, the fourth sensor 43 may be a flowmeter that measures the flow rate of a fluid such as a liquid or gas flowing through the equipment 1 as the observed value A4.

(Configuration of Estimation Device)

The estimation device 2 is a device for estimating a parameter PR of each model of the equipment 1, the first observation system 3, and the second observation system 4.

Also, the estimation device 2 is a device for providing a network model NWM including the estimated parameter PR to the abnormality diagnosis device 5.

The estimation device 2 includes an observation system constraint determination unit 22, a model estimation unit 23, and a consistency determination unit 24.

For example, the estimation device 2 may further include a physical quantity constraint determination unit 25 and a model constraint determination unit 26.

Also, the estimation device 2 may further include an acquisition unit 21 and an output unit 27.

(Composition of Acquisition Unit)

The acquisition unit 21 acquires the first observed value OB1.

For example, the acquisition unit 21 may acquire the observed value A1 from the first observation system 3 as the first observed value OB1.

For example, the acquisition unit 21 may acquire the internal pressure of the equipment 1 measured by the first sensor 31 as the observed value A1.

The acquisition unit 21 acquires the second observed value OB2.

For example, the acquisition unit 21 may acquire the observed values A2, A3, and A4 from the second observation system 4 as the second observed value OB2.

For example, the acquisition unit 21 may acquire the outlet temperature measured by the second sensor 41 as the observed value A2.

For example, the acquisition unit 21 may acquire the inlet temperature measured by the third sensor 42 as the observed value A3.

For example, the acquisition unit 21 may acquire the flow rate measured by the fourth sensor 43 as the observed value A4.

(Configuration of Observation System Constraint Determination Unit)

The observation system constraint determination unit 22 determines data DT2 within the constraint that is data within a first constraint R1 from time-series data DT1 of observed values of the first observed value OB1 observed in the first observation system 3 and the second observed value OB2 observed in the second observation system 4.

By determining the consistency of a separate item of each observation system with a constraint condition, the observation system constraint determination unit 22 determines whether or not each observed value is data associated with abnormal behavior as a separate item.

For example, as shown in FIG. 2, the observation system constraint determination unit 22 may determine data DT2 inside of a constraint according to an observation system constraint such as a constraint related to a maximum value and a minimum value, a constraint related to a moving average change rate, a constraint related to a spike generation frequency, or a constraint related to a variance within the time window as the first constraint R1.

Thereby, the observation system constraint determination unit 22 determines that a record of each observed value including an abnormal value when viewed alone is abnormal on the basis of a measurement principle (a physical law) of each observation system itself.

Figure 15:
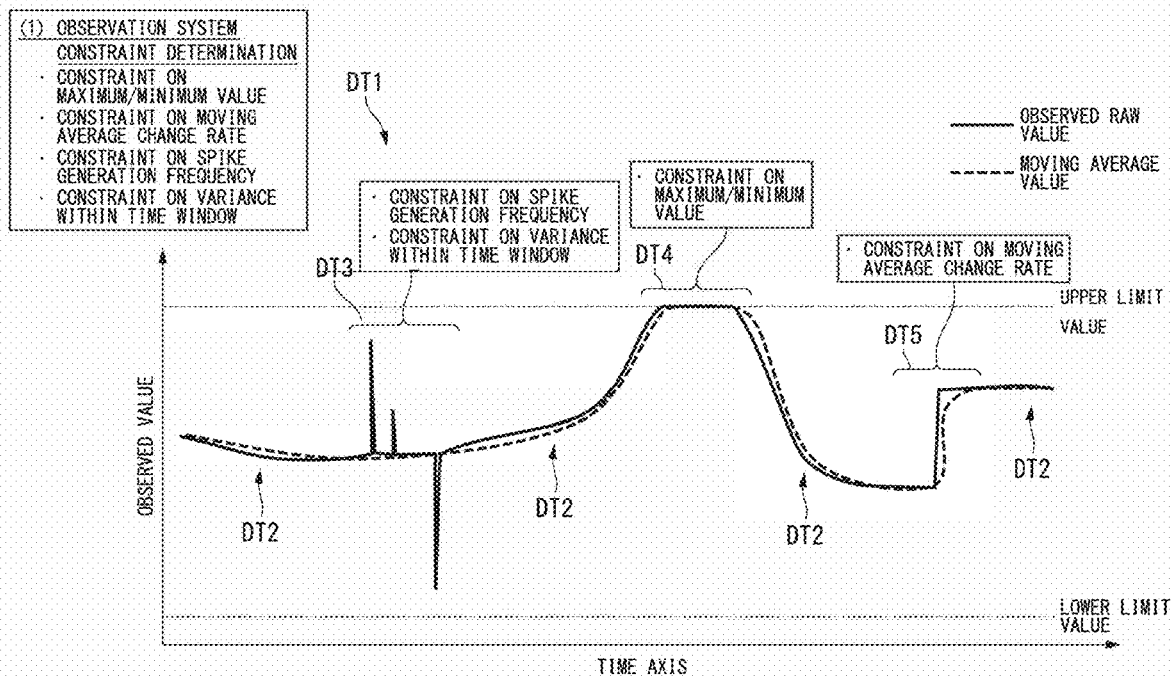
FIG. 15 is a diagram for describing a function of an observation system constraint determination unit in the fourth embodiment of the present disclosure.

For example, in the case of FIG. 15, within the time-series data DT1 that is time-series data of observed raw values observed in each observation system, data DT3 is data whose spike generation frequency of an observed value is greater than a prescribed threshold value or data whose variance of the observed value inside of the time window is greater than a prescribed threshold value, and is determined to be outside of a constraint due to the first constraint R1.

Likewise, within the time-series data DT1, data DT4 is data whose observed value is greater than a maximum value prescribed by an upper limit value or data whose observed value is less than a minimum value prescribed by a lower limit value, and is determined to be outside of a constraint due to the first constraint R1.

Likewise, within the time-series data DT1, data DT5 is data whose moving average change rate is greater than a prescribed threshold value, and is determined to be outside of a constraint due to the first constraint R1.

On the other hand, data that is not outside of the constraint is determined to be data DT2 within the constraint.

For example, when an out-of-constraint determination has been made in any observation system among the observation systems, the observation system constraint determination unit 22 may make the out-of-constraint determination even with respect to the data of the other observation system at the same time and the estimation device 2 may not perform a subsequent process.

(Composition of Model Estimation Unit)

The model estimation unit 23 estimates parameters PR of a plurality of models including an observation model MLO that is a model of each observation system and a physical model MLP that is a model inside of the equipment 1 in which the observation system is provided on the basis of the data DT2 within the constraint.

For example, the model estimation unit 23 may include the network model NWM including a plurality of observation models MLO and a plurality of physical models MLP.

For example, each of the plurality of observation models MLO and the plurality of physical models MLP may include a parameter PR.

For example, the model estimation unit 23 may estimate the parameter PR of each of the observation models MLO and the physical models MLP in a network model NWM1 as shown in FIG. 3, which is an example of the network model NWM.

Figure 16:
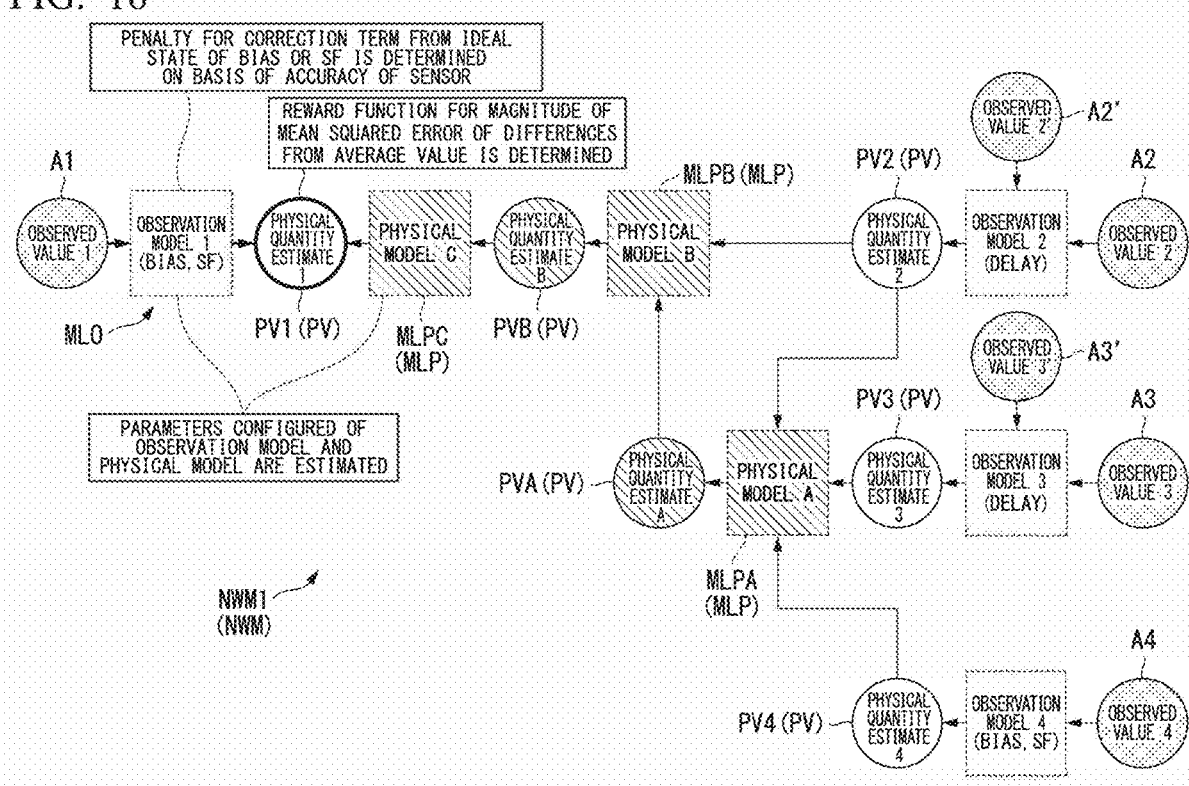
FIG. 16 is a diagram for describing a function of a model estimation unit in the fourth embodiment of the present disclosure.

As shown in FIG. 16, in the network model NWM1, the model estimation unit 23 can estimate the physical quantity estimate PV1, which is one of a plurality of physical quantity estimates PV1, from the observed value A1 via one observation model MLO.

On the other hand, in the network model NWM1, the model estimation unit 23 can estimate the physical quantity estimate PV1 from the observed value A2, the observed value A3, and the observed value A4 via the plurality of observation models MLO and the plurality of physical models MLP.

That is, in the network model NWM1, the model estimation unit 23 can estimate a common physical quantity estimate PV1 from different systems.

As shown in FIG. 16, for example, in the model estimation unit 23, the parameter PR of the observation model MLO related to the observed value A2 may be estimated from the observed value A2 and an observed value A2' before the step in which the observed value A2 is observed (an observed value A2' measured at a point in time immediately before the observed value A2 is measured).

Likewise, in the model estimation unit 23, the parameter PR of the observation model MLO related to the observed value A3 may be estimated from the observed value A3 and an observed value A3' before the step in which the observed value A3 is observed (an observed value A3' measured at a point in time immediately before the observed value A3 is measured).

(Configuration of Model)

For example, each of the observation model MLO and the physical model MLP may be expressed in the form of a nonlinear polynomial based on a theoretical formula and an empirical formula. At this time, a coefficient of the polynomial corresponds to the parameter PR and becomes a parameter for expressing a variation in the actual equipment 1.

Here, the physical model MLP will be described in detail. For example, each physical model MLP may be a model derived from known pure physical laws in physical phenomena.

For example, a physical model MLPA shown in FIG. 16 may be a model in which a physical quantity estimate PVA indicating a work quantity within the equipment 1 such as a refrigerating capacity or the like can be calculated from a physical quantity estimate PV2 indicating an outlet temperature, a physical quantity estimate PV3 indicating an inlet temperature, and a physical quantity estimate PV4 indicating a flow rate.

For example, a physical model MLPB shown in FIG. 16 may be a model in which a physical quantity estimate PVB indicating a saturated temperature inside of the equipment 1 can be calculated from the physical quantity estimate PV2 indicating the outlet temperature and the physical quantity estimate PVA indicating the work quantity.

For example, a physical model MLPC shown in FIG. 16 may be a model in which a physical quantity estimate PV1 indicating the pressure (saturated vapor pressure) within the equipment 1 can be calculated from the physical quantity estimate PVB indicating the saturation temperature inside of the equipment 1.

Next, the observation model MLO will be described in detail.

Figure 17:
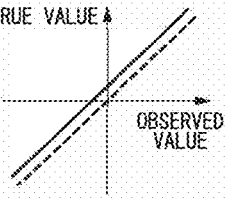
FIG. 17 is a diagram for describing an observation model in the fourth embodiment of the present disclosure.

For example, each observation model MLO may be a representative model as shown in FIG. 17.

In FIG. 17, an error from a true value caused due to the characteristics of the sensor is indicated as an internal cause and an error caused due to a cause other than a value of an observation target is indicated as an external cause.

In addition to the internal and external causes that can be modeled, observed values are further affected by random noise components.

Also, it is necessary for the external cause to be assumed to be any one of a "negligibly small" cause, an "external cause measured by another sensor," and a cause having an "amount of data capable of being handled as noise."

Figure 18:
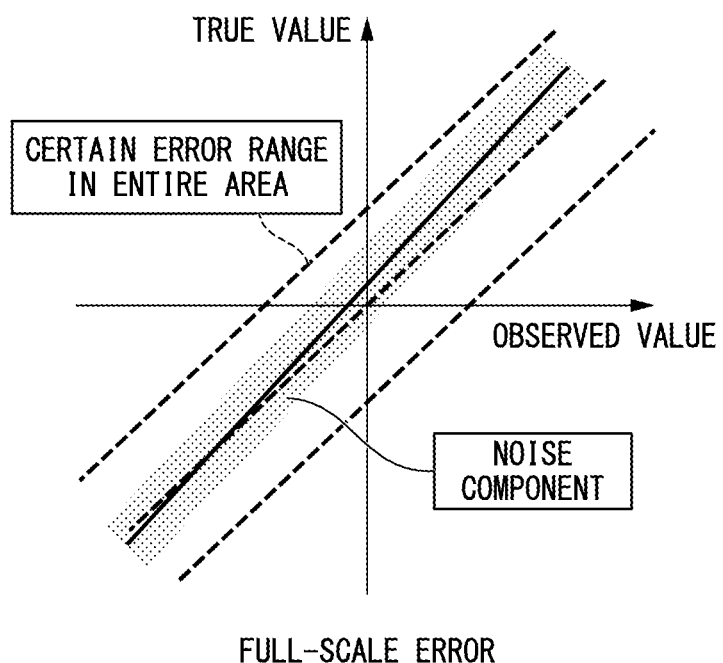
FIG. 18 is a diagram for describing a full-scale error.
Figure 19:
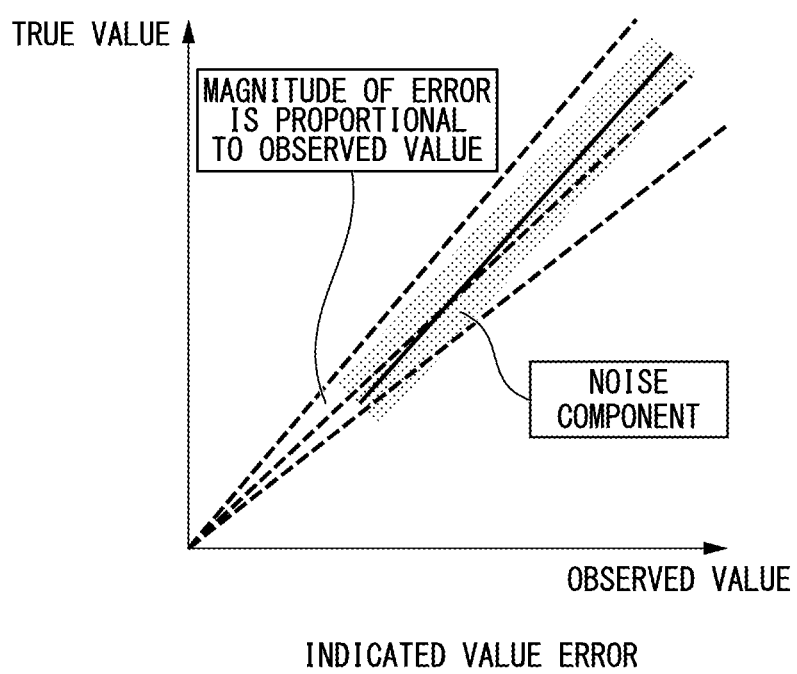
FIG. 19 is a diagram for describing an indicated value error.

The accuracy of the observation system is prescribed by a full-scale error (±0% F.S.) shown in FIG. 18 or an indicated value error (±0% R.D.) as shown in FIG. 19 after all errors are taken into account or an index obtained by combining these errors.

Also, these error ranges indicate only the accuracy when the normal operation is performed and deviate from the range when the sensor is misaligned or malfunctioned.

Also, when the same value is continuously measured, a magnitude of a variation in a result of comparing values obtained by taking the time window average is referred to as Allan variance.

Figure 20:
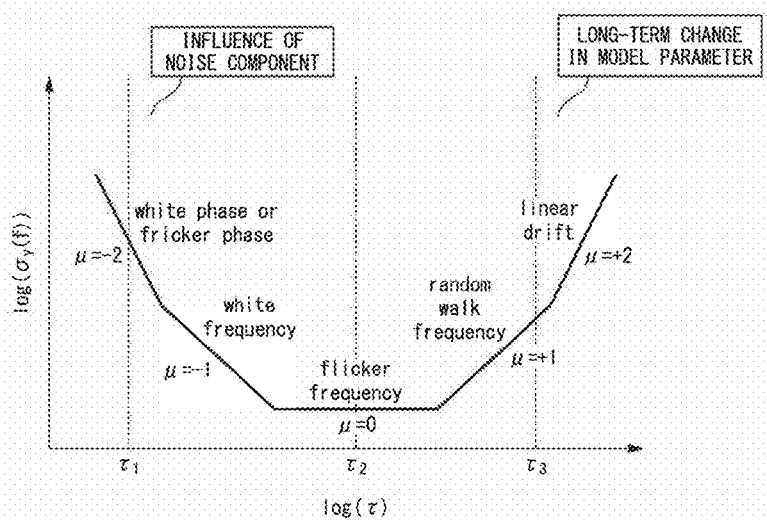
FIG. 20 is a diagram for describing Allan variance.

Typical Allan variance shows variance as shown in FIG. 20. Also, σy(f) shown in FIG. 20 is a value related to a magnitude of the Allan variance.

Figure 21:
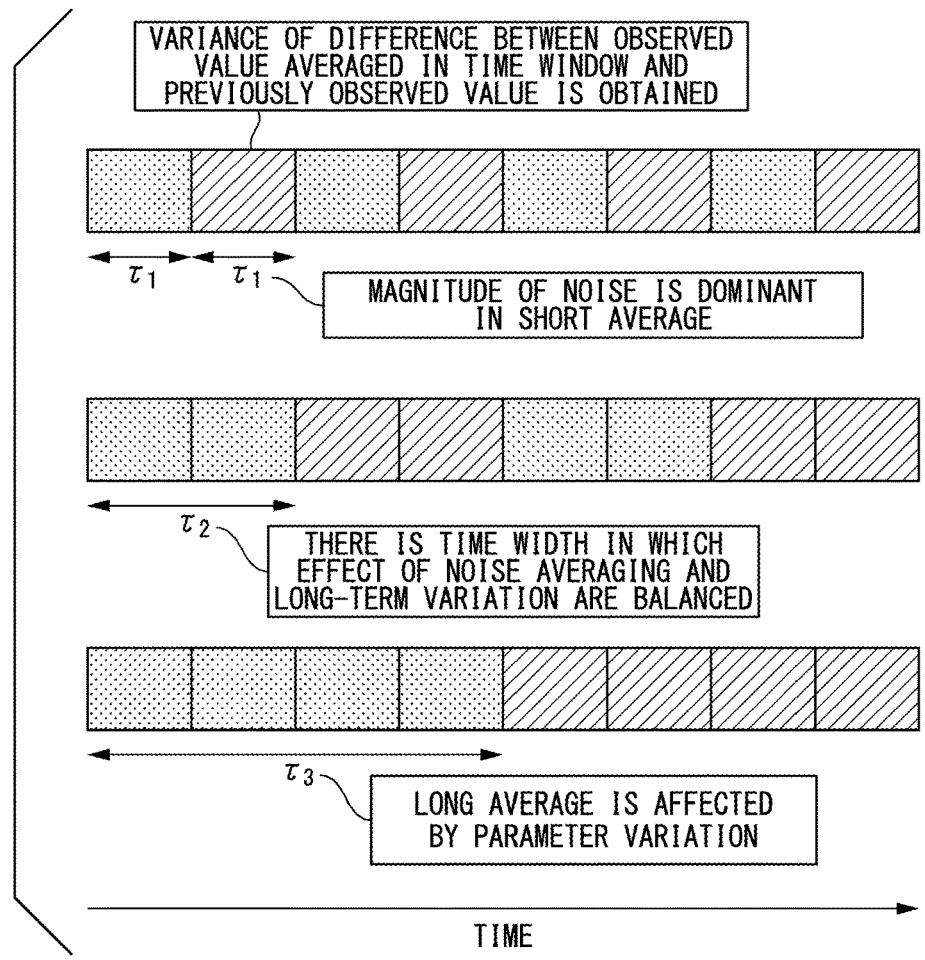
FIG. 21 is a diagram for describing the relationship between the Allan variance and a time window.

As shown in FIGS. 20 and 21, while an average time τ is short, the influence of noise is dominant and a variation between the average values gradually decreases. However, when the average time τ is extended, the influence of long-term fluctuations in the observation system parameters becomes apparent and the variation gradually increases.

Therefore, for example, the parameter PR of the observation model MLO may be estimated ideally on the basis of record data in which the Allan variance is only minimized.

For example, the model estimation unit 23 may accumulate sums of squares of average values of physical quantity estimates PV of all systems and errors of the physical quantity estimates PV of the systems in all records with respect the physical quantity estimates PV capable of being estimated from the systems using data of a number of records required to estimate each parameter PR from the most recent observed value within the data DT2 within the constraint that is not abnormal as an observed value of a separate item in the observation system constraint determination unit 22. At this time, a reward function for the correctness of the estimation may be determined on the basis of a magnitude of a penalty coefficient predetermined for an accumulated value and a magnitude of a correction term of each parameter PR and the parameter PR may be estimated so that a value thereof is minimized.

For example, the model estimation unit 23 may estimate the parameter PR so that a sum of a penalty for the deviation between the physical quantity estimates PV1 estimated from the systems and a penalty for the correction term of each parameter PR is minimized with respect to an observation system in which a common physical quantity estimate PV1 can be derived by converting values based on models of the network model NWM1.

Also, even if the number of observation systems is generally extremely small with respect to the number of parameters PR to be estimated, the model estimation unit 23 can estimate the physical quantity estimate PV1 using a plurality of records.

For example, the observation model MLO may be an observation model in which an appropriate range is simplified in consideration of usage conditions of the equipment 1 and specifications of each sensor instead of a faithfully modeled observation model.

For example, in the observation model MLO related to the observed value A1, the penalty for the correction term from the ideal state of a bias or scale factor (hereinafter also referred to as "SF") may be determined on the basis of the accuracy of the sensor.

The model estimation unit 23 may be configured so that a reward function for a magnitude of a mean squared error of differences of the physical quantity estimates PV1 from an average value of a plurality of physical quantity estimates PV1 is determined as deviation between physical quantity estimates estimated from the systems in the network model NWM1.

Figure 22:
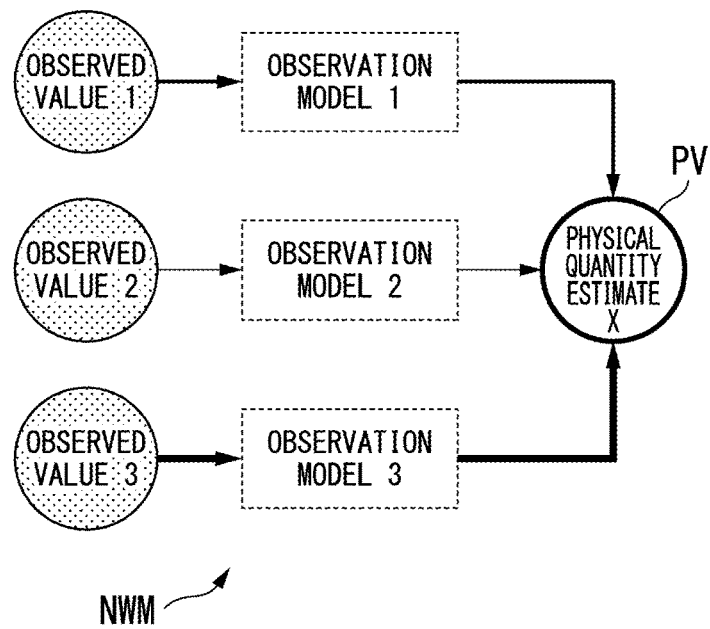
FIG. 22 is a diagram for describing a function of the model estimation unit in the fourth embodiment of the present disclosure.

For example, as shown in FIG. 22, when each physical quantity estimate PV can be estimated from three or more different systems in the network model NWM including the plurality of models, the model estimation unit 23 may determine a reward function for a magnitude of a mean squared error of differences of physical quantity estimates PV from an average value of a plurality of physical quantity estimates PV as the deviation between the physical quantity estimates PV estimated from the three or more systems.

Likewise, in the case shown in FIG. 22, the model estimation unit 23 may estimate the parameter PR so that a sum of the penalty for the deviation between the physical quantity estimates PV estimated from the three or more systems and the penalty for the correction term of each parameter PR is minimized.

(Configuration of Consistency Determination Unit)

The consistency determination unit 24 determines the consistency of the model from deviation between the first observed value OB1 and the first predicted observed value PA1 predicted from the second observed value OB2 on the basis of parameters PR of the plurality of models estimated by the model estimation unit 23.

Thereby, the consistency determination unit 24 can cause a certain observed value from another observed value to regress on the basis of the estimated parameter PR and evaluate a magnitude of the deviation.

Here, the first predicted observed value PA1 is a value derived by value conversion based on each model of the network model NWM1 and is a value corresponding to the first observed value OB1 in the network model NWM1.

For example, the consistency determination unit 24 may compare the first predicted observed value PA1, which is a regression result predicted on the basis of the parameter PR of each model estimated by the model estimation unit 23, with the first observed value OB1, which is an actually measured value.

For example, as the model consistency, the consistency determination unit 24 may determine whether the deviation between the first predicted observed value PA1 predicted from the second observed value OB2 and the first observed value OB1 is within a specification range of the first observation system 3.

Figure 23:
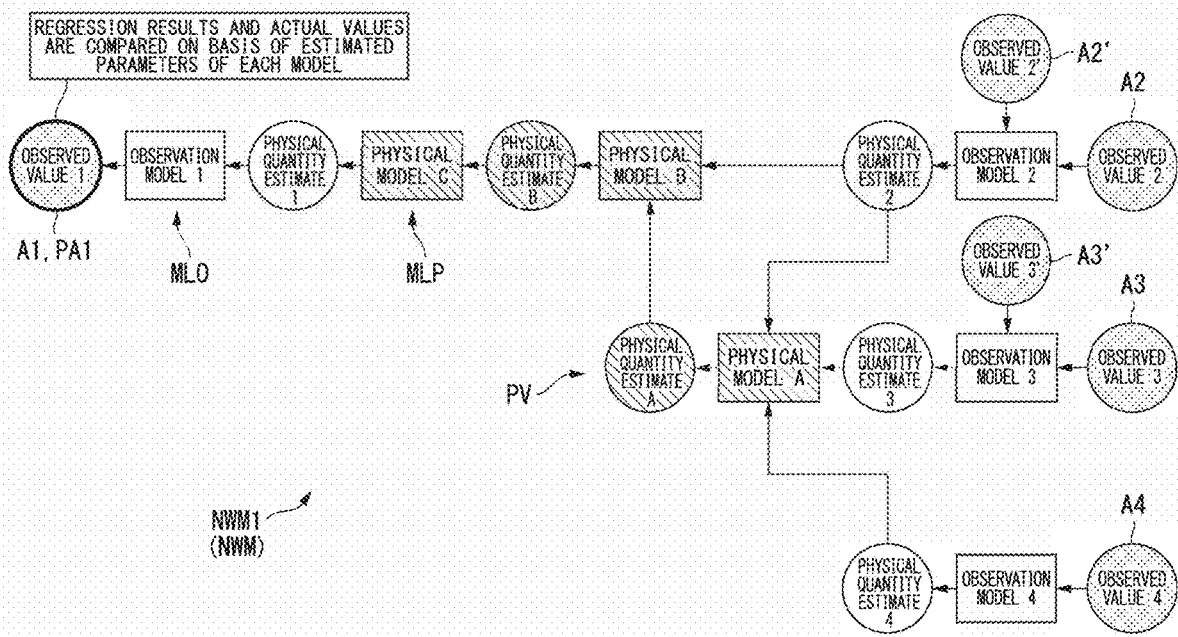
FIG. 23 is a diagram for describing a function of a consistency determination unit in the fourth embodiment of the present disclosure.

For example, as shown in FIG. 23, as the model consistency, the consistency determination unit 24 may determine whether deviation between the observed value A1 and the first predicted observed value PA1 predicted from the observed value A2, the observed value A3, and the observed value A4 is within a specification range of the first observation system 3.

For example, the consistency determination unit 24 may predict the first predicted observed value PA1 from the observed value A2, the observed value A3, and the observed value A4 via the plurality of observation models MLO and the plurality of physical models MLP in which the parameter PR estimated by the model estimation unit 23 is introduced and compare the first predicted observed value PA1, which has been predicted, with the observed value A1.

For example, the consistency determination unit 24 may acquire a difference between the first predicted observed value PA1 and the first observed value OB1 as the deviation between the first predicted observed value PA1 and the first observed value OB1. At this time, as a model consistency determination, the consistency determination unit 24 may determine that the plurality of observation models MLO and plurality of physical models MLP in which the parameter PR is introduced are consistent if the acquired difference is less than or equal to a prescribed threshold value.

For example, the consistency determination unit 24 may perform mutual regression and evaluate mutual consistency for all observation systems.

Figure 24:
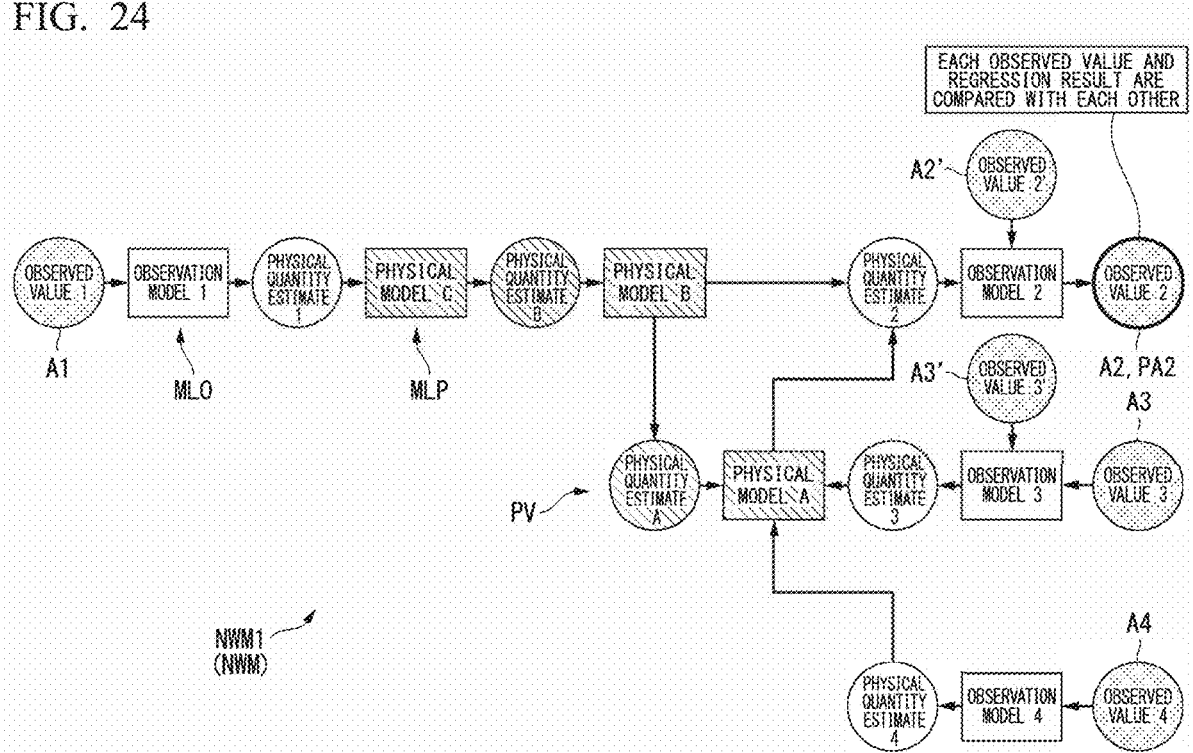
FIG. 24 is a diagram for describing a function of the consistency determination unit in the fourth embodiment of the present disclosure.

For example, in addition to the evaluation shown in FIG. 23, as shown in FIG. 24, the consistency determination unit 24 may predict the second predicted observation value PA2 from the observed value A1, the observed value A3 and the observed value A4 via the plurality of observation models MLO and plurality of physical models MLP into which the parameter PR estimated by the model estimation unit 23 is introduced and may further compare the predicted second predicted observation value PA2 with the observed value A2.

Furthermore, as in the evaluation related to the observed value A1 shown in FIG. 23 and the evaluation related to the observed value A2 shown in FIG. 24, the consistency determination unit 24 may perform an evaluation process related to the observed value A3 on the basis of the observed value A1, the observed value A2, and the observed value A4 or may perform an evaluation process related to the observed value A4 on the basis of the observed value A1, the observed value A2, and the observed value A3.

Figure 25:
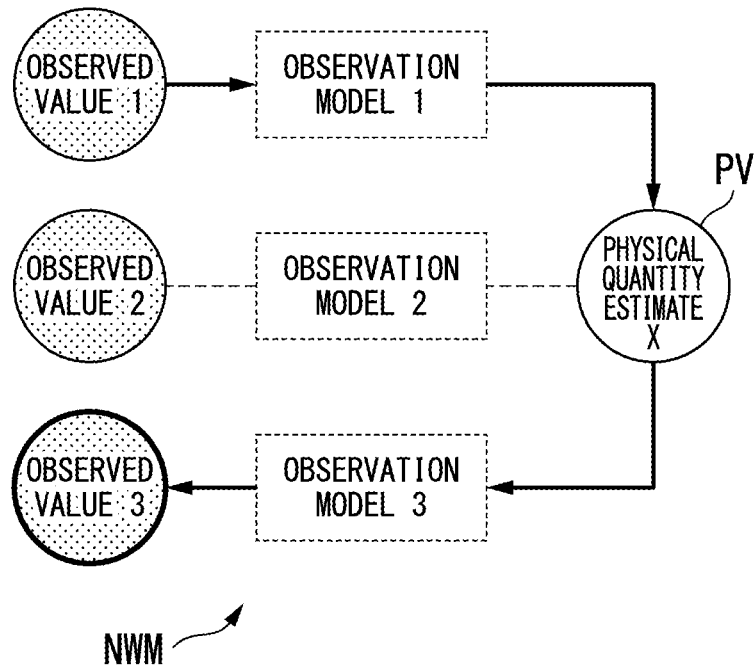
FIG. 25 is a diagram for describing a function of the consistency determination unit in the fourth embodiment of the present disclosure.
Figure 26:
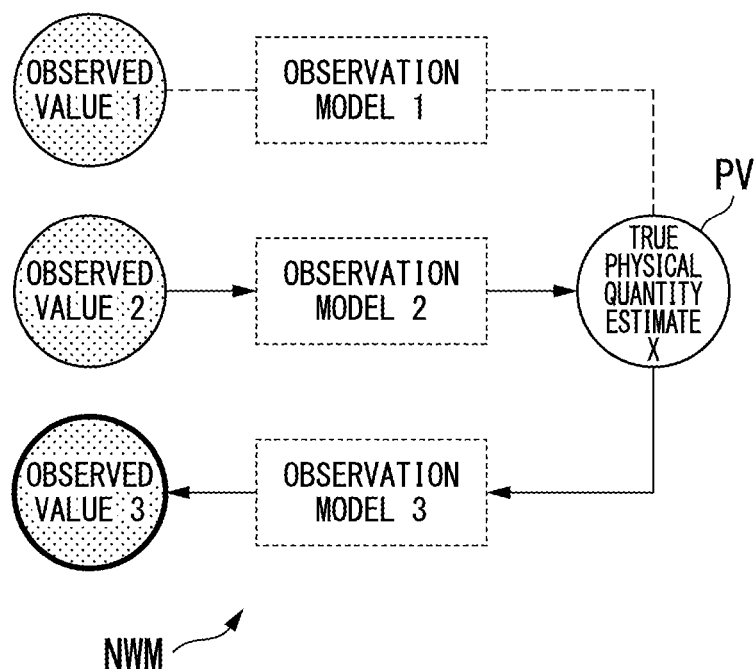
FIG. 26 is a diagram for describing a function of the consistency determination unit in the fourth embodiment of the present disclosure.

For example, as shown in FIGS. 25 and 26, when there are a plurality of independent systems for causing the same observed value to regress, the consistency determination unit 24 may obtain deviation for each system associated with the regression and use a minimum value of a plurality of deviations that have been obtained as an observed value evaluation result.

(Configuration of Physical Quantity Constraint Determination Unit)

The physical quantity constraint determination unit 25 determines whether or not the physical quantity estimate PV estimated on the basis of the parameter PR is within a second constraint R2.

Here, the physical quantity estimate PV is a physical quantity in the equipment 1 estimated by the physical model MLP.

For example, the physical quantity constraint determination unit 25 may determine whether or not the physical quantity estimate PV estimated on the basis of the parameter PR when the consistency determination unit 24 determines that the models are consistent and the observed value of the data DT2 within the constraint is within the second constraint R2.

For example, the second constraint R2 may be a prescribed numerical range indicating a physical quantity that is less than or equal to the design level (specification) of the equipment 1.

For example, the physical quantity constraint determination unit 25 may determine that the physical quantity estimate PV is normal if it is within the second constraint R2 and that the physical quantity estimate PV is abnormal if it is not within the second constraint R2. When the physical quantity estimate PV is determined to be normal, the parameter PR introduced in each model can be regarded as appropriate in the determination of the physical quantity constraint determination unit 25.

For example, when the physical quantity estimate PV is determined to be abnormal, the physical quantity constraint determination unit 25 may determine that the equipment 1 is abnormal.

That is, it is possible to determine that the equipment 1 is abnormal if the physical quantity estimate PV, which is a physical quantity, does not fall within the constraint of the design specification on the basis of the assumption that a physical quantity can be estimated for the data DT2 within the constraint, which is a record determined to be normal.

For example, when each observed value of the data DT2 within the constraint is time-discrete due to the application of the first constraint R1, the physical quantity constraint determination unit 25 may perform a time interpolation process for observed values that are discrete and may estimate the physical quantity estimate PV on the basis of the observed value corrected in time.

For example, the physical quantity constraint determination unit 25 may determine whether or not the physical quantity estimate PV estimated at each time step is within the second constraint R2.

For example, the physical quantity constraint determination unit 25 may compare each estimated physical quantity estimate PV with the design level (specification) and may convert the estimated physical quantity estimate PV into discrete data of about two to seven levels by determining that it is within the specification, is greater than or equal to the specification, or is less than or equal to the specification.

(Configuration of Model Constraint Determination Unit)

The model constraint determination unit 26 determines whether or not each parameter PR is inside of a third constraint R3.

For example, the model constraint determination unit 26 may determine whether or not each parameter PR when the models are determined to be consistent in the consistency determination unit 24 is within the third constraint R3.

For example, the third constraint R3 for each parameter PR in the physical model MLP may be a prescribed numerical range indicating a parameter less than or equal to the design level (specification) of the equipment 1.

For example, the third constraint R3 for each parameter PR in the observation model MLO may be a prescribed numerical range indicating the parameter within the design level (specification) of each observed value.

For example, the model constraint determination unit 26 may determine that each parameter PR is normal if it is within the third constraint R3 or may determine that each parameter PR is abnormal if it is not within the third constraint R3. When each parameter PR is determined to be normal, the parameter PR introduced in each model can be regarded as appropriate in the determination process of the model constraint determination unit 26.

For example, each parameter PR determined by the model constraint determination unit 26 may be a parameter estimated for each batch window or each moving window that has undergone mutual regression.

For example, the model constraint determination unit 26 may compare each estimated parameter PR with the design level (specification) and may convert the estimated parameter PR into discrete data of about two to seven levels by determining that it is within the specification, is greater than or equal to the specification, or is less than or equal to the specification.

For example, when the parameter PR of the physical model MLP is determined to be abnormal, the model constraint determination unit 26 may determine that the equipment 1 is abnormal.

That is, it is possible to determine that the equipment 1 is abnormal if the parameter PR of the physical model MLP does not fall within the constraint of the design specification on the basis of the assumption that parameter estimation is performed correctly.

For example, when the parameter PR of the observation model MLO is determined to be abnormal, the model constraint determination unit 26 may determine that the observation system is abnormal. Furthermore, the model constraint determination unit 26 may determine that a sensor related to the observation model MLO having the parameter PR determined to be abnormal is abnormal. That is, it is possible to determine that the observation system is abnormal if the parameter PR of the observation model MLO does not fall within the constraint of the design specification on the basis of the assumption that parameter estimation is performed correctly.

(Configuration of Output Unit)

The output unit 27 outputs a parameter PR determined to be normal and a physical quantity estimate PV estimated on the basis of the parameter PR.

Also, the output unit 27 outputs a parameter PR determined to be abnormal and a physical quantity estimate PV estimated on the basis of the parameter PR. For example, when the parameter PR determined to be abnormal is the parameter PR of the observation model MLO, the output unit 27 may output information indicating that the sensor related to the observation model MLO having the parameter PR determined to be abnormal is abnormal.

For example, the output unit 27 may output information indicating that the equipment 1 is abnormal when the parameter PR determined to be abnormal is the parameter PR of the physical model MLP.

(Operation of Estimation Device)

The operation of the estimation device 2 of the present embodiment will be described.

The operation of the estimation device 2 corresponds to the estimation method of the present embodiment.

Figure 27:
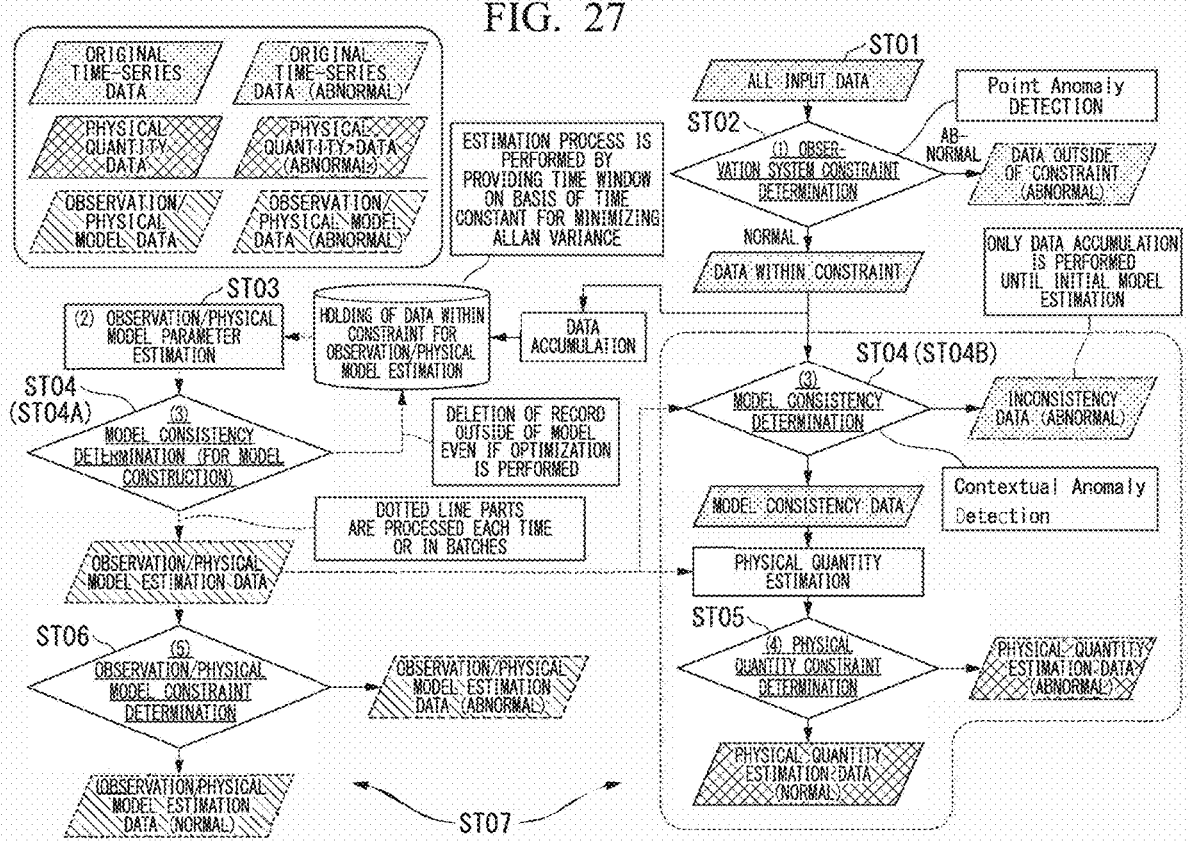
FIG. 27 is a flowchart of an estimation method in the fourth embodiment of the present disclosure.
Figure 28:
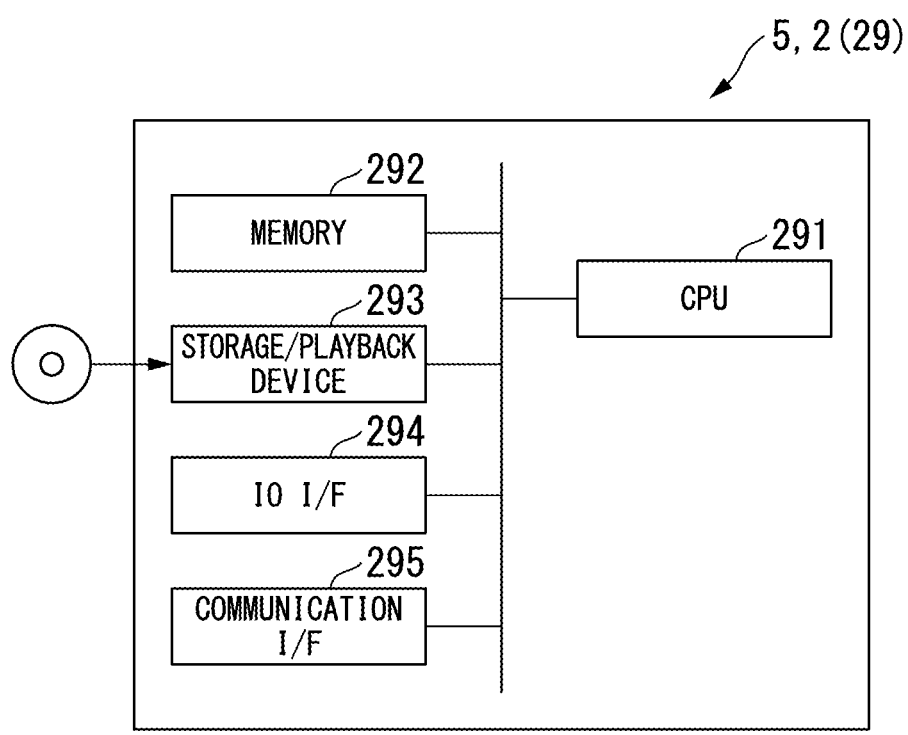
FIG. 28 is a diagram showing an example of a computer hardware configuration provided in the abnormality diagnosis device and the estimation device according to each embodiment.

The operation of the estimation device 2 may be performed, for example, as shown in FIG. 27.

First, the acquisition unit 21 acquires the first observed value OB1 observed in the first observation system 3 and the second observed value OB2 observed in the second observation system 4 (ST01: acquisition step).

After the execution of ST01, the observation system constraint determination unit 22 determines the data DT2 within the constraint that is data within the first constraint R1 from the time-series data DT1 of observed values of the first observed value OB1 and the second observed value OB2 (ST02: observation system constraint determination step).

After the execution of ST02, the model estimation unit 23 estimates parameters PR of a plurality of models including an observation model MLO that is a model of each observation system and a physical model MLP that is a model within the equipment 1 in which the observation system is provided on the basis of the data DT2 within the constraint (ST03: model estimation step).

After the execution of ST03, the consistency determination unit 24 determines model consistency from deviation between the first observed value OB1 and the first predicted observed value PA1 predicted from the second observed value OB2 on the basis of the parameters PR of the plurality of models estimated by the model estimation unit 23 (ST04: consistency determination step).

For example, in ST04, the consistency determination unit 24 may determine that there is an abnormality in the observation model or the physical model when the deviation is greater than a prescribed value (ST04A). At this time, the consistency determination unit 24 may delete records that deviate from the model even if optimized.

For example, after the execution of ST04A, the consistency determination unit 24 may determine inconsistent data within the data DT2 within the constraint and exclude the inconsistent data from the data DT2 within the constraint as abnormal data (ST04B).

For example, after the execution of ST04, the physical quantity constraint determination unit 25 may determine whether or not the physical quantity estimate PV estimated on the basis of the parameter PR is within the second constraint R2 (ST05: physical quantity constraint determination step).

For example, in parallel with ST05, the model constraint determination unit 26 may determine whether or not each parameter PR is within the third constraint R3 (ST06: model constraint determination step).

For example, after the execution of ST04 and ST05, the output unit 27 may output a parameter PR determined to be normal and a physical quantity estimate PV estimated on the basis of the parameter PR and may output a parameter PR determined to be abnormal and a physical quantity estimate PV estimated on the basis of the parameter PR (ST07: output step).

(Function of Abnormality Diagnosis Device)

The abnormality diagnosis device 5 according to the present embodiment is different from the third embodiment in that the estimate acquisition unit 55 acquires the physical quantity estimate PV of the equipment 1 from the estimation device 2. That is, the estimate acquisition unit 55 of the abnormality diagnosis device 5 according to the present embodiment acquires the physical quantity estimate PV estimated by the estimation device 2 as the state quantity of the equipment 1 in step S122 of FIG. 13.

Also, the abnormality determination unit 52 of the abnormality diagnosis device 5 according to the present embodiment may further determine whether or not there is an abnormality in the equipment 1 on the basis of determination results of the observation system constraint determination unit 22 and the physical quantity constraint determination unit 25 of the estimation device 2. For example, in step S123 of FIG. 13, the abnormality determination unit 52 of the abnormality diagnosis device 5 may determine that an observed value is abnormal when there is data (an observed value) determined to be outside of the first constraint R1 by the observation system constraint determination unit 22 of the estimation device 2. Likewise, in step S123 of FIG. 13, the abnormality determination unit 52 of the abnormality diagnosis device 5 may determine that a physical quantity estimate PV is abnormal when there is a physical quantity estimate PV determined to be outside of the second constraint R2 by the physical quantity constraint determination unit 25 of the estimation device 2.

Operation and Effects

As described above, in the abnormality diagnosis device 5 according to the present embodiment, the estimate acquisition unit 55 acquires the physical quantity estimate PV of the equipment 1 estimated by the estimation device 2 as the state quantity of the equipment 1.

Also, because the estimation device 2 according to the present embodiment can estimate and optimize the parameters PR of a plurality of models including the observation model MLO and the physical model MLP, it is possible to estimate a more accurate physical quantity estimate PV.

Thus, the abnormality diagnosis device 5 can further improve the accuracy of estimating the cause of an abnormality using an accurate physical quantity estimate PV.

<Hardware Configuration of Computer>

Also, in each of the above-described embodiments, a program for implementing various types of functions of the abnormality diagnosis device 5 and the estimation device 2 is recorded on a computer-readable recording medium and various types of processing are performed by causing a computer system such as a microcomputer to read and execute the program recorded on the recording medium. Here, the above-described various types of processing are performed by storing the process of the various types of processing of a CPU of a computer system in a computer-readable recording medium in the form of a program and causing the computer to read and execute the program. Also, the computer-readable recording medium is a magnetic disk, a magneto-optical disk, a CD-ROM, a DVD-ROM, a semiconductor memory, or the like. Also, the computer program may be delivered to the computer via a communication circuit and the computer having received the delivered program may execute the program.

In each of the above-described embodiments, an example of a hardware configuration of the computer for executing the program for implementing the various types of functions of the abnormality diagnosis device 5 and the estimation device 2 will be described.

As shown in FIG. 20, the computer 29 provided in each of the abnormality diagnosis device 5 and the estimation device 2 includes a CPU 291, a memory 292, a storage/playback device 293, an input output interface (hereinafter referred to as an "IO I/F") 294, and a communication interface (hereinafter referred to as a "communication I/F") 295.

The memory 292 is a medium such as a random-access memory (hereinafter referred to as a "RAM") temporarily storing data and the like used by a program executed in each of the abnormality diagnosis device 5 and the estimation device 2.

The storage/playback device 293 is a device for storing data and the like in external media such as a CD-ROM, a DVD, or a flash memory or for reproducing data of external media or the like.

The IO I/F 294 is an interface for inputting/outputting information and the like between the abnormality diagnosis device 5 and the estimation device 2 and other devices.

The communication I/F 295 is an interface that performs communication between the estimation device 2 and another device via a communication circuit such as the Internet or a dedicated communication circuit.

Other Embodiments

While embodiments of the present disclosure have been described above, these embodiments have been presented by way of example only, and are not intended to limit the scope of the disclosure. These embodiments may be embodied in a variety of other forms. Various omissions, substitutions, and changes may be made without departing from the spirit of the disclosure. The disclosure is intended to cover such embodiments or modifications as would fall within the scope and spirit of the disclosure.

APPENDIXES

For example, the abnormality diagnosis device, abnormality diagnosis method, and recording medium storing the program described in the above-described embodiments are ascertained as follows.

(1) According to a first aspect, the abnormality diagnosis device 5 includes the abnormality determination unit 52 configured to determine whether or not there is an abnormality with respect to a state quantity acquired from the equipment 1; and the cause estimation unit 53 configured to estimate a cause of the abnormality in the equipment 1 from a state quantity determined to be abnormal by the abnormality determination unit 52 using a cause correspondence table in which a cause of an abnormal mode of the equipment identified in fault tree analysis is associated with the state quantity that is abnormal when the cause has occurred.

Thereby, the abnormality diagnosis device 5 can easily and accurately estimate the cause of the abnormality in the equipment 1 on the basis of the cause correspondence table.

(2) According to a second aspect, the abnormality diagnosis device 5 of the first aspect (1) further includes the observed value acquisition unit 51 configured to acquire an observed value observed by an observation system of the equipment as the state quantity, wherein the abnormality determination unit 52 determines whether or not there is an abnormality in the equipment 1 by comparing the observed value acquired by the observed value acquisition unit 51 with a normal value or a normal pattern of each observed value.

Thereby, the abnormality diagnosis device 5 can easily and accurately estimate the cause of the abnormality using, for example, the observed value observed by the existing observation system of the equipment 1 and the cause correspondence table.

(3) According to a third aspect, in the abnormality diagnosis device 5 of the aspect (1) or (2), the abnormality determination unit 52 further determines an abnormality degree with respect to each state quantity in accordance with a difference from a constraint set for each state quantity and the cause estimation unit 53 estimates the cause of the abnormality in the equipment 1 using the cause correspondence table in which the cause is further associated with the abnormality degree of the state quantity that is abnormal when the cause has occurred.

Thereby, the abnormality diagnosis device 5 can narrow down the causes more finely by subdividing each observed value into a larger number of abnormality levels instead of two levels of "normal" or "abnormal."

(4) According to a fourth aspect, the abnormality diagnosis device 5 of the aspect (2) further includes the estimate acquisition unit 55 configured to acquire a physical quantity estimate of the equipment 1 estimated on the basis of the observed value acquired by the observed value acquisition unit 51 as the state quantity.

Thereby, the abnormality diagnosis device 5 can perform the determination of whether or not there is an abnormality and the estimation of the cause of the abnormality using the physical quantity estimates PV1 and PV2 obtained by estimating the internal state quantity within the equipment 1 in addition to the observed value A1 acquired from the first observation system 3 of the equipment 1. Thereby, the abnormality diagnosis device 5 can improve the detection accuracy even in an abnormal mode whose detection is difficult only by changing the observed value.

(5) According to a fifth aspect, there is provided an abnormality diagnosis method including steps of: determining whether or not there is an abnormality with respect to a state quantity acquired from the equipment 1; and estimating a cause of the abnormality in the equipment 1 from a state quantity determined to be abnormal using a cause correspondence table in which a cause of an abnormal mode of the equipment 1 identified in fault tree analysis is associated with the state quantity that is abnormal when cause has occurred.

(6) According to a sixth aspect, there is provided a non-transitory computer-readable recording medium storing a program for causing the computer 29 of the abnormality diagnosis device 5 to execute steps of: determining whether or not there is an abnormality with respect to a state quantity acquired from the equipment 1; and estimating a cause of the abnormality in the equipment 1 from a state quantity determined to be abnormal using a cause correspondence table in which a cause of an abnormal mode of the equipment 1 identified in fault tree analysis is associated with the state quantity that is abnormal when the cause has occurred.

According to the present disclosure, an abnormality diagnosis device, an abnormality diagnosis method, and a recording medium storing a program can easily and accurately estimate a cause of an abnormality in equipment.

REFERENCE SIGNS LIST

2 Estimation device
21 Acquisition unit
22 Observation system constraint determination unit
23 Model estimation unit
24 Consistency determination unit
25 Physical quantity constraint determination unit
26 Model constraint determination unit
27 Output unit
29 Computer
3 First observation system
31 First sensor
32 Second sensor
33 Third sensor
4 Second observation system
41 Second sensor
42 Third sensor
43 Fourth sensor
5 Abnormality diagnosis device
51 Observed value acquisition unit
52 Abnormality determination unit
53 Cause estimation unit
54 Notification unit
55 Estimate acquisition unit

What is claimed is:

1. An abnormality diagnosis device comprising:
a processor configured to:
   detect whether each of observed values acquired from equipment is normal or abnormal;
   upon detecting an abnormal observed value among the observed values, calculate an abnormality degree that is an evaluation value obtained by discretizing the abnormal observed value into a plurality of levels based on a difference from a constraint set for the abnormal observed value;
   store a cause correspondence table in which a cause of an abnormal mode of the equipment identified in fault tree analysis is associated with each of patterns of observed values, wherein
      the patterns are each defined by a combination of abnormal observed values respectively having abnormality degrees of specific levels;
   based on the abnormality degree that has been calculated, estimate a cause of an abnormality in the equipment using the cause correspondence table, by identifying which of the patterns corresponds to the observed values acquired from the equipment; and
   transmit a notification of a fact that the abnormal mode has occurred and the cause of the abnormality in the equipment.

2. The abnormality diagnosis device according to claim 1, wherein
the processor detects whether each of the observed values is normal or abnormal by comparing each of the observed values acquired from the equipment with a normal value or a normal pattern of each of the observed values.

3. The abnormality diagnosis device according to claim 2, wherein
the processor is further configured to:
   acquire, as the observed values, physical quantity estimated values of the equipment that are estimated by a time interpolation process of the observed values that are discrete.

4. An abnormality diagnosis method comprising:
detecting whether each of observed values acquired from equipment is normal or abnormal;
upon detecting an abnormal observed value among the observed values, calculating an abnormality degree that is an evaluation value obtained by discretizing the abnormal observed value into a plurality of levels based on a difference from a constraint set for the abnormal observed value;
storing a cause correspondence table in which a cause of an abnormal mode of the equipment identified in fault tree analysis is associated with each of patterns of observed values, wherein
   the patterns are each defined by a combination of abnormal observed values respectively having abnormality degrees of specific levels;
based on the abnormality degree that has been calculated, estimating a cause of an abnormality in the equipment using the cause correspondence table, by identifying which of the patterns corresponds to the observed values acquired from the equipment; and
transmitting a notification of a fact that the abnormal mode has occurred and the cause of the abnormality in the equipment.

5. A non-transitory computer-readable recording medium that stores a program for causing a computer of an abnormality diagnosis device to execute:
detecting whether each of observed values acquired from equipment is normal or abnormal;
upon detecting an abnormal observed value among the observed values, calculating an abnormality degree that is an evaluation value obtained by discretizing the abnormal observed value into a plurality of levels based on a difference from a constraint set for the abnormal observed value;
storing a cause correspondence table in which a cause of an abnormal mode of the equipment identified in fault tree analysis is associated with each of patterns of observed values, wherein
   the patterns are each defined by a combination of abnormal observed values respectively having abnormality degrees of specific levels;
based on the abnormality degree that has been calculated, estimating a cause of an abnormality in the equipment using the cause correspondence table, by identifying which of the patterns corresponds to the observed values acquired from the equipment; and
transmitting a notification of a fact that the abnormal mode has occurred and the cause of the abnormality in the equipment.

* * * * *